(12) United States Patent
Brotherton-Ratcliffe et al.

(10) Patent No.: US 9,096,314 B2
(45) Date of Patent: Aug. 4, 2015

(54) ELECTRIC VTOL AIRCRAFT

(75) Inventors: David Brotherton-Ratcliffe, Pease Pottage (GB); Jerzy Lelusz, Mold Flintshire (GB)

(73) Assignee: Geola Technologies, Ltd., Brighton (GB)

( * ) Notice: Subject to any disclaimer, the term of this patent is extended or adjusted under 35 U.S.C. 154(b) by 556 days.

(21) Appl. No.: 13/257,810

(22) PCT Filed: Mar. 22, 2010

(86) PCT No.: PCT/GB2010/000520
§ 371 (c)(1),
(2), (4) Date: Nov. 21, 2011

(87) PCT Pub. No.: WO2010/106343
PCT Pub. Date: Sep. 23, 2010

(65) Prior Publication Data
US 2012/0056040 A1    Mar. 8, 2012

(30) Foreign Application Priority Data

Mar. 20, 2009    (GB) .................................. 0904875.2

(51) Int. Cl.
| | |
|---|---|
| B64C 29/02 | (2006.01) |
| B64C 27/20 | (2006.01) |
| B64C 29/00 | (2006.01) |
| B64C 39/02 | (2006.01) |
| B64D 27/24 | (2006.01) |

(52) U.S. Cl.
CPC ............. B64C 27/20 (2013.01); B64C 29/0025 (2013.01); B64C 39/024 (2013.01); B64D 27/24 (2013.01); B64C 2201/027 (2013.01); B64C 2201/042 (2013.01); B64C 2201/108 (2013.01); B64C 2201/162 (2013.01); Y02T 50/64 (2013.01)

(58) Field of Classification Search
CPC   B64C 29/0025; B64C 27/20; B64C 29/0033; B64C 39/024; Y02T 50/145
USPC .............................. 244/12.1, 12.3, 23 B, 23 R
See application file for complete search history.

(56) References Cited

U.S. PATENT DOCUMENTS

| | | | | |
|---|---|---|---|---|
| 2,940,689 | A | * | 6/1960 | Howell ........................ 244/12.3 |
| 3,139,244 | A | * | 6/1964 | Bright ........................ 244/12.3 |
| 4,664,340 | A | | 5/1987 | Jackson |

(Continued)

FOREIGN PATENT DOCUMENTS

| | | |
|---|---|---|
| ES | 2288083 | 12/2007 |
| ES | 2293818 | 3/2008 |

(Continued)

*Primary Examiner* — Brian M O'Hara
*Assistant Examiner* — George Andonyan
(74) *Attorney, Agent, or Firm* — Diederiks & Whitelaw, PLC

(57) ABSTRACT

An electric and hybrid Vertical-Take Off and Landing ("VTOL") aircraft is disclosed comprising a plurality of small Electric Ducted Fans ("EDFs") of various sizes and orientations. The thrust of each fixed EDF is individually controlled by modulation of motor power by one or more onboard microcomputers connected to a plurality of onboard laser distance measuring sensors, at least three onboard three-axis accelerometers and at least one GPS thereby allowing extremely precise and safe VTOL operation. The aircraft may be employed to allow robotic and passenger vehicles to transition extremely quickly between normal linear flight and VTOL and to operate in extreme and gusty conditions.

20 Claims, 11 Drawing Sheets

(56) References Cited

U.S. PATENT DOCUMENTS

| | | | |
|---|---|---|---|
| 5,454,531 A * | 10/1995 | Melkuti | 244/12.6 |
| 6,254,032 B1 | 7/2001 | Bucher | |
| 8,181,903 B2 * | 5/2012 | Posva | 244/12.3 |
| 2002/0104921 A1 * | 8/2002 | Louvel | 244/12.1 |
| 2003/0062443 A1 | 4/2003 | Wagner et al. | |
| 2003/0080242 A1 * | 5/2003 | Kawai | 244/12.4 |
| 2003/0085319 A1 | 5/2003 | Wagner et al. | |
| 2006/0016930 A1 | 1/2006 | Pak | |
| 2006/0226281 A1 * | 10/2006 | Walton | 244/17.23 |
| 2006/0231677 A1 | 10/2006 | Zimet et al. | |
| 2007/0018035 A1 | 1/2007 | Saiz et al. | |
| 2007/0057113 A1 * | 3/2007 | Parks | 244/12.5 |
| 2010/0301168 A1 * | 12/2010 | Raposo | 244/171.2 |
| 2011/0001001 A1 * | 1/2011 | Bryant | 244/12.5 |

FOREIGN PATENT DOCUMENTS

| | | |
|---|---|---|
| GB | 2423509 | 8/2006 |
| JP | 2009083798 | 4/2009 |
| WO | 2005/072233 | 8/2005 |
| WO | 2006/113877 | 10/2006 |
| WO | WO 2008054234 A1 * | 5/2008 |

* cited by examiner

ELECTRIC VTOL AIRCRAFT

The present invention relates to the field of electric aviation and in particular to the stable Vertical Take-Off and Landing ("VTOL") capability of flying platforms and vehicles and to the controlled transition from VTOL to linear flight.

Various groups are currently involved in producing electric aeroplanes although the technology is still in its infancy.

Manned electric aircraft trace their history to the French Dirigible, La France, which flew in 1884 a distance of five miles in 23 minutes powered by a 7.5 horsepower electric motor and Chromium Chloride batteries.

On Jul. 16, 2006 the Tokyo Institute of Technology flew a full-sized electric aeroplane piloted by one man. The aircraft flew a distance of nearly 400 m at Okegawa airport near Tokyo and attained a height of around 6 m in its minute long flight. It was powered by 160 AA batteries. It is pertinent to note that this flight was significantly longer than the Wright Brothers' original flight on Dec. 17, 1903 which attained just 259 m.

On Dec. 23, 2007 the French group APAME flew its ELECTRA aircraft a distance of about 50 km from Aspres sur Buëich. The mono-place aircraft was powered by an 18 kW electric motor manufactured by the UK company LMC and carried 47 kg of Lithium-polymer batteries. The aircraft reached a cruising speed of 90 km/hr.

Various other companies are currently working in the field. The Slovenian company Pipistrel is developing an electric glider, the Tarus Electro, that has already demonstrated self-launch capability and is expected to become commercially available in the near future. Boeing's subsidiary Phantom Works is developing a hybrid light aircraft capable of a range of 300 miles and the French group LISA is aiming at flying an electrically powered light aircraft, the Hy-Bird, around the world from Courchevel.

More generally, VTOL aircraft have been successfully developed for some time. Aside from the helicopter which cannot transition to conventional linear (winged) flight, perhaps the most famous example is the Hawker Siddeley Harrier. More recently the V-22 Osprey has demonstrated the effectiveness of the tilt-rotor concept. Various other VTOL aircraft are currently planned to come into operation within the coming years. However, many are extremely complex and costly aircraft.

A lower cost approach to VTOL is being pursued by Carter Aviation Technologies who is developing a compound VTOL aircraft which also has separate helicopter blades.

The Moller Corporation has for some time been developing the idea of a much simpler and fundamentally cheaper solution to a VTOL vehicle. The M400 Skycar is based on 4 ducted fans each powered by specially developed low-weight rotary engines burning conventional fuel. Thrust is vectored by means of controllable vanes and a computerized flight management system maintains stable flight through active feedback.

The Israeli company Urban Aeronautics is following a similar approach with its X-Hawk vehicle which is expected to be commercialised in 2010. The X-Hawk is powered by several larger ducted fans, a system of actively controlled multiple control vanes and four internal combustion engines.

Present ducted-fan vehicles such as the M400 Skycar and the X-Hawk would seem to represent the most promising approach to realising a cheap compact VTOL aircraft. However, the flight stability and safety of current ducted-fan VTOL vehicles has unfortunately much to be desired.

It is therefore desired to provide an improved VTOL aircraft.

According to an aspect of the present invention there is provided a Vertical Take-Off and Landing ("VTOL") aircraft comprising a plurality of electrically powered ducted fans.

The plurality of electrically powered ducted fans preferably comprises at least 10, 20, 30, 40, 50, 60, 70, 80, 90, 100, 110, 120, 130, 140, 150, 160, 170, 180, 190, 200, 250, 300, 350, 400, 450 or 500 electrically powered ducted fans.

One or more of the fans preferably comprise a plurality of rotatable blades mounted in a cylindrical shroud or duct.

One or more of the fans preferably comprise carbon-fibre or other composite material elements.

One or more of the fans are preferably powered by one or more batteries and/or other sources of electrical energy.

The one or more batteries and/or other sources of electrical energy are preferably selected from the group consisting of: (i) one or more lithium polymer batteries; (ii) one or more super-capacitors; and (iii) one or more air-breathing batteries.

The one or more batteries and/or other sources of electrical energy may be recharged in flight by one or more electrical generators connected to one or more gas turbines and/or one or more internal combustion engines and/or one or more other sources of energy.

One or more of the fans may be powered by one or more electrical generators connected to one or more gas turbines and/or one or more internal combustion engines and/or one or more other sources of energy.

One or more of the fans are preferably arranged to provide a maximum thrust selected from the group consisting of: (i) $\geq$ 30 N; (ii) $\geq$40 N; (iii) $\geq$50 N; (iv) $\geq$60 N; (v) $\geq$70 N; (vi) $\geq$80 N; (vii) $\geq$90 N; (viii) $\geq$100 N; (ix) $\geq$110 N; (x) $\geq$120 N; (xi) $\geq$130 N; (xii) $\geq$140 NJ; (xiii) $\geq$150 N; (xiv) $\geq$160 N; (xv) $\geq$170 N; (xvi) $\geq$180 N; (xvii) $\geq$190 N; (xviii) $\geq$200 N; (xix) $\geq$250 N; (xx) $\geq$300 N; (xxi) $\geq$350 N; (xxii) $\geq$400 N; (xxiii) $\geq$450 N; and (xxiv) $\geq$500 N.

One or more of the fans preferably have a diameter selected from the group consisting of: (i)<10 cm; (ii) 10-15 cm; (iii) 15-20 cm; (iv) 20-25 cm; (v) 25-30 cm; (vi) 30-35 cm; (vii) 35-40 cm; (viii) 40-45 cm; (ix) 45-50 cm; and (x)>50 cm.

The thrust of one or more of the fans is preferably controlled by altering the power supplied to a motor driving the fan.

The motor is preferably controlled by Pulse Width Modulation ("PWM").

According to an embodiment the thrust of the aircraft may be controlled by controlling:

(i) a plurality of fans by modulating the power supplied to motors driving the fans; and (ii) a plurality of vanes arranged in the exit flow of a plurality of fans by varying the position and/or orientation of the vanes.

At least some of the fans may be arranged and/or operated so that in a mode of operation the net angular momentum of the fans is substantially zero so that the aircraft is not caused to rotate substantially about a given axis.

At least some of the fans may be arranged and/or operated so that in a mode of operation the net angular momentum of the fans is arranged to be non-zero so that the aircraft may be caused to rotate in a controlled or desired manner.

In a mode of operation a first plurality of the fans may be arranged to rotate in a first direction and a second plurality of the fans are arranged to rotate in a second direction, the second direction being counter to the first direction.

In a mode of operation one or more adjacent and/or parallel fans may be arranged to rotate in opposite directions.

One or more of the fans may comprise contra-rotating ducted fans comprising two sets of blades contra-rotating within the same duct or shroud.

The aircraft may further comprise one or more first vanes arranged in the outlet of one or more of the fans, the one or more first vanes being movable in order to control the net angular momentum of the aircraft.

The aircraft may further comprise one or more first vanes arranged in the outlet of one of more of the fans, the one or more first vanes being arranged so as to nullify or reduce the net angular momentum of each the fan.

The plurality of fans preferably comprises a first plurality of vertically mounted fans for controlling the aircraft in a vertical direction.

The first plurality of vertically mounted fans preferably comprises at least 1, 5, 10, 20, 30, 40, 50, 60, 70, 80, 90, 100, 110, 120, 130, 140, 150, 160, 170, 180, 190, 200 or 250 fans having a first diameter.

The plurality of fans preferably further comprises a second plurality of vertically mounted fans for controlling the aircraft in a vertical direction.

The second plurality of vertically mounted fans preferably comprises at least 1, 5, 10, 20, 30, 40, 50, 60, 70, 80, 90, 100, 110, 120, 130, 140, 150, 160, 170, 180, 190, 200 or 250 fans having a second diameter.

The ratio of the second diameter to the first diameter is preferably selected from the group consisting of: (i) 1.0-1.5; (ii) 1.5-2.0; (iii) 2.0-2.5; (iv) 2.5-3.0; (v) 3.0-3.5; (vi) 3.5-4.0; (vii) 4.0-4.5; (viii) 4.5-5.0; and (ix)>5.0.

The plurality of fans preferably comprises a plurality of vertically mounted fans for controlling the aircraft in a vertical direction, wherein the plurality of vertically mounted fans comprises a first group of fans powered by one or more first batteries and/or first other sources of electrical energy and a second group of fans powered by one or more second batteries and/or second other sources of electrical energy wherein failure of the one or more first batteries and/or first other sources of electrical energy does not result in failure of the second group of fans.

The plurality of fans preferably comprises a third plurality of horizontally or laterally mounted fans for controlling the aircraft in a horizontal or lateral direction.

The third plurality of horizontally or laterally mounted fans preferably comprises at least 1, 5, 10, 20, 30, 40, 50, 60, 70, 80, 90, 100, 110, 120, 130, 140, 150, 160, 170, 180, 190, 200 or 250 fans having a third diameter.

The third plurality of horizontally or laterally mounted fans preferably comprises at least some fans which are able to produce thrust in either a forward or reverse direction.

The third plurality of horizontally or laterally mounted fans preferably comprises a first group of fans mounted in a first horizontal direction and a second group of fans mounted in a second horizontal direction, wherein the second horizontal direction is substantially orthogonal to the first horizontal direction.

The ratio of the second diameter to the third diameter is preferably selected from the group consisting of: (i) 1.0-1.5; (ii) 1.5-2.0; (iii) 2.0-2.5; (iv) 2.5-3.0; (v) 3.0-3.5; (vi) 3.5-4.0; (vii) 4.0-4.5; (viii) 4.5-5.0; and (ix)>5.0.

The first plurality of vertically mounted fans preferably have an average value of static thrust $T1_{static}$ and a dynamic thrust $T1_{dynamic}$ and wherein the third plurality of horizontally or laterally mounted fans have an average value of dynamic thrust $T3_{dynamic}$, wherein $T1_{static}>T1_{dynamic}$ and/or wherein $T3_{dynamic}>T1_{dynamic}$.

The second plurality of vertically mounted fans preferably have an average value of static thrust $T2_{static}$ and a dynamic thrust $T2_{dynamic}$ and wherein the third plurality of horizontally or laterally mounted fans have an average value of dynamic thrust $T3_{dynamic}$, wherein $T2_{static}>T2_{dynamic}$ and/or wherein $T3_{dynamic}>T2_{dynamic}$.

The first plurality of vertically mounted fans preferably have an average value of exhaust airflow velocity $V1$ and wherein the third plurality of horizontally or laterally mounted fans have an average value of exhaust airflow velocity $V3$, wherein $V3>V1$.

The second plurality of vertically mounted fans preferably have an average value of exhaust airflow velocity $V2$ and wherein the third plurality of horizontally or laterally mounted fans have an average value of exhaust airflow velocity $V3$, wherein $V3>V2$.

In a mode of operation a first plurality of fans may be operated with a first vertical thrust and a second plurality of fans may be operated with a second different vertical thrust in order to control the flight angle of the aircraft.

The aircraft may further comprise a plurality of second vanes for thrust vectoring and/or for converting vertical thrust into thrust having a horizontal or lateral component and/or for converting horizontal or lateral thrust into thrust having a vertical component.

One or more of the fans may be rotatable or pivotable for thrust vectoring and/or for converting vertical thrust into thrust having a horizontal or lateral component and/or for converting horizontal or lateral thrust into thrust having a vertical component.

The aircraft may further comprise one or more distance determining devices or sensors for determining the vertical distance between one or more of the fans or other components of the aircraft and the ground or another location.

The distance determining devices or sensors are preferably selected from the group consisting of: (i) a laser ranging time of flight sensor; (ii) an inertial navigation system comprising one or more accelerometers; (iii) a Global Positioning System ("GPS") device; (iv) a camera or video camera system; and (v) an image recognition system.

The aircraft is preferably arranged and adapted to transport a human passenger and/or a load of at least 100 kg.

The aircraft preferably possesses a gross weight of greater than 30 kg.

The aircraft may comprise a remotely controlled drone, a self-controlled drone, a remotely controlled passenger carrying aircraft or a pilot controlled aircraft.

The aircraft preferably further comprises a cock-pit and a control panel for a pilot.

In a mode of operation the aircraft may be operated as a Short Take-Off and Landing ("STOL") aircraft.

The aircraft preferably further comprises a redundant flight control system having Multiple independent channels in order to prevent loss of flight control in the event of failure of one or more channels.

The aircraft preferably further comprises a redundant flight sensor system having multiple independent channels in order to prevent loss of sensor signals in the event of failure of one or more channels.

According to an embodiment:

(i) in a first mode of operation one or more vertically mounted fans and one or more horizontally or laterally mounted fans are used to control the flight of the aircraft; and (ii) in a second mode of operation one or more horizontally or laterally mounted fans and one or more ailerons and/or rudders and/or flaps and/or other aircraft control surfaces are used to control the flight of the aircraft.

The aircraft preferably comprises one or more batteries and one or more solar panels or other devices for recharging the batteries during flight and/or in preparation for take-off.

The aircraft may further comprise:

a first plurality of laterally mounted electric ducted fans mounted in the nose region of the aircraft;

a second plurality of laterally mounted electric ducted fans mounted in the tail region of the aircraft;

a plurality of sensors arranged to measure the horizontal component of ground velocity at each fan location; and a control system arranged to vary or control the thrust of at least some of the first plurality of fans and/or the second plurality of fans in order to control lateral drift of the aircraft.

The aircraft may further comprise:

a plurality of vertically mounted electric ducted fans;

a plurality of sensors arranged to determine loss of vertical lift due to wind-shear, and a control system arranged to vary or control the thrust of at least some of the fans in order to compensate for loss of vertical lift due to wind-shear.

According to another aspect of the present invention there is provided an aircraft comprising at least 10, 20, 30, 40, 50, 60, 70, 80, 90, 100, 110, 120, 130, 140, 150, 160, 170, 180, 190, 200, 250, 300, 350, 400, 450 or 500 electrically powered ducted fans.

Each of the electrically powered ducted fans preferably comprises an independent power generation system, engine or battery for powering the fan wherein failure of a power generation system, engine or battery does not result in failure of other power generation systems, engines or batteries.

According to an embodiment the aircraft may comprise a Vertical Take-Off and Landing ("VTOL") aircraft, a Short Take-Off and Landing ("STOL") aircraft, a fixed wing aircraft, a helicopter, a pilotless aircraft or a piloted aircraft.

The aircraft is preferably arranged and adapted to transport a human passenger and/or a load of at least 100 kg.

According to an aspect of the present invention there is provided a method of operating a Vertical Take-Off and Landing ("VTOL") aircraft comprising using a plurality of electrically powered ducted fans to propel the aircraft.

According to an aspect of the present invention there is provided a method of operating an aircraft comprising using at least 10, 20, 30, 40, 50, 60, 70, 80, 90, 100, 110, 120, 130, 140, 150, 160, 170, 180, 190, 200, 250, 300, 350, 400, 450 or 500 electrically powered ducted fans to propel the aircraft.

According to an aspect of the present invention there is provided a method of controlling a Vertical Take-Off and Landing aircraft during take-off and/or landing and/or transition from vertical to horizontal flight and/or transition from horizontal to vertical flight, the aircraft comprising a plurality of electrically powered ducted fans, the method comprising:

(i) increasing, decreasing or varying power to at least some or all or the fans until one or more sensors determine that the distance between one or more of the fans or another component of the aircraft and the ground or another location is increasing, decreasing or remaining substantially constant; and/or (ii) switching between using first sensors and second sensors to determine the distance between one or more of the fans or another component of the aircraft and the ground or another location as the distance is determined to increase, decrease or remain substantially constant; and/or (iii) raising or lowering a landing gear; and/or (iv) determining a flight plan or receiving a flight plan and adjusting power to at least some or all the fans so that the aircraft is guided along side flight plan; and/or (v) adjusting or formulating a new flight plan in response to sensor data and/or received instructions; and/or (vi) deploying or retracting a foldable or retractable aerofoil; and/or (vii) selecting or adjusting a flight angle or angle of attack; and/or (viii) sealing or covering one or more fans when the aircraft makes a transition from vertical to horizontal flight; and/or (ix) unsealing or uncovering one or more fans when the aircraft makes a transition from horizontal to vertical flight; and/or (x) propelling the aircraft in a vertical direction using the one or more fans; and/or (xi) propelling the aircraft in a horizontal or lateral direction using one or more gas turbine engines.

According to an aspect of the present invention there is provided a fixed wing aircraft arranged and adapted to carry a human passenger and/or a load of at least 100 kg comprising a hybrid propulsion system, the hybrid propulsion system comprising:

a plurality of electrically powered ducted fans for propelling the aircraft in a vertical and/or horizontal direction; and one or more propellers for propelling the aircraft in a horizontal direction or one or more turbo-fans or jet engines for propelling the aircraft in a horizontal direction.

According to an aspect of the present invention there is provided a method of propelling a fixed wing aircraft arranged and adapted to carry a human passenger and/or a load of at least 100 kg comprising:

using a plurality of electrically powered ducted fans to propel the aircraft in a vertical and/or horizontal direction; and using one or more propellers or one or more turbo-fans or jet engines to propel the aircraft in a horizontal direction.

According to an aspect of the present invention there is provided helicopter arranged and adapted to carry a human passenger and/or a load of at least 100 kg comprising a hybrid propulsion system, the hybrid propulsion system comprising:

a plurality of electrically powered ducted fans for propelling the helicopter in a vertical and/or horizontal direction; and a rotor for propelling the aircraft in a vertical and/or horizontal direction.

The helicopter preferably further comprises an anti-torque tail rotor.

According to an aspect of the present invention there is provided a method of propelling a helicopter arranged and adapted to carry a human passenger and/or a load of at least 100 kg comprising:

using a plurality of electrically powered ducted fans to propel the helicopter in a vertical and/or horizontal direction; and using a rotor to propel the aircraft in a vertical and/or horizontal direction.

According to an aspect of the present invention there is provided a Vertical Take-Off and Landing ("VTOL") aircraft comprising:

at least 10 electrically powered ducted fans, wherein a first group of fans are mounted vertically to control the aircraft in a vertical direction and a second group of fans are mounted horizontally or laterally to control the aircraft in a horizontal direction which is substantially orthogonal to the vertical direction;

a plurality of batteries or other independent power sources for powering the fans;

a plurality of sensors to determine flight parameters of the aircraft; and one or more Electronic Speed Controllers ("ESCs") arranged to receive sensor data from the plurality of sensors and to control the thrust of the aircraft by varying one or more parameters of the first group of fans and/or one or more parameters of the second group of fans.

According to an aspect of the present invention there is provided a method of operating a Vertical Take-Off and Landing ("VTOL") aircraft comprising:

providing at least 10 electrically powered ducted fans, wherein a first group of fans are mounted vertically to control the aircraft in a vertical direction and a second group of fans are mounted horizontally or laterally to control the aircraft in a horizontal direction which is substantially orthogonal to the vertical direction;

providing a plurality of batteries or other independent power sources for powering the fans;

providing a plurality of sensors to determine flight parameters of the aircraft; and receiving sensor data from the plurality of sensors and controlling the thrust of the aircraft by varying one or more parameters of the first group of fans and/or one or more parameters of the second group of fans.

According to an aspect of the present invention there is provided an aircraft comprising:

a first plurality of laterally mounted electric ducted fans mounted in the nose region of the aircraft;

a second plurality of laterally mounted electric ducted fans mounted in the tail region of the aircraft;

a plurality of sensors arranged to measure the horizontal component of ground velocity at each fan location; and a control system arranged to vary or control the thrust of at least some of the first plurality of fans and/or the second plurality of fans in order to control lateral drift of the aircraft.

According to an aspect of the present invention there is provided a method of controlling lateral drift of an aircraft comprising:

providing an aircraft comprising a first plurality of laterally mounted electric ducted fans mounted in the nose region of the aircraft, a second plurality of laterally mounted electric ducted fans mounted in the tail region of the aircraft;

measuring the horizontal component of ground velocity at each fan location; and varying or controlling the thrust of at least some of the first plurality of fans and/or the second plurality of fans in order to control lateral drift of the aircraft.

According to an aspect of the present invention there is provided an aircraft comprising:

a plurality of vertically mounted electric ducted fans;

a plurality of sensors arranged to determine loss of vertical lift due to wind-shear; and a control system arranged to vary or control the thrust of at least some of the fans in order to compensate for loss of vertical lift due to wind-shear.

According to an aspect of the present invention there is provided a method of compensating for loss of vertical lift of an aircraft due to wind-shear comprising:

providing an aircraft comprising a plurality of vertically mounted electric ducted fans;

determining loss of vertical lift due to wind-shear; and varying or controlling the thrust of at least some of the fans in order to compensate for loss of vertical lift due to wind-shear.

According to an aspect of the present invention there is provided a VTOL aircraft comprising:

a plurality of small electric motor powered ducted fans; one or more batteries;

a means to sense the distance to the ground at a plurality of positions on the aircraft surface;

a means to measure the acceleration of the aircraft in 3 directions at a plurality of positions on the aircraft surface;

one or more on-board microcomputer systems connected to the electric motors and to the means of distance and acceleration measurement;

wherein the electrical power supplied to the electric ducted fans from the batteries is controlled by the microcomputer in such a way as to control flight path and flight stability.

According to another aspect of the present invention there is provided a flying platform comprising:

a plurality of small electric motor powered ducted fans; one or more batteries;

a means to sense the distance to the ground at a plurality of positions on the aircraft surface;

a means to measure the acceleration of the aircraft in 3 directions at a plurality of positions on the aircraft surface;

one or more on-board microcomputer systems connected to the electric motors and to the means of distance and acceleration measurement;

wherein the electrical power supplied to the electric ducted fans from the batteries is controlled by the microcomputer in such a way as to control flight path and stability in the VTOL phase.

According to another aspect of the present invention there is provided a VTOL aircraft comprising:

a plurality of electric motor powered ducted fans of one size;

an additional plurality of electric motor powered ducted fans of a smaller size;

one or more batteries;

a means to sense the distance to the ground at a plurality of positions on the aircraft surface;

a means to measure the acceleration of the aircraft in 3 directions at a plurality of positions on the aircraft surface;

one or more on-board microcomputer systems connected to the electric motors and to the means of distance and acceleration measurement;

wherein the electrical power from the batteries supplied to the larger electric ducted fans is controlled by the microcomputer in such a way as to assure approximate vertical equilibrium during the VTOL phase and the electrical power supplied to the smaller electric ducted fans is controlled by the microcomputer in such a way as to provide rapid corrections of the craft's attitude and position to those required.

According to another aspect of the present invention there is provided a VTOL aircraft comprising:

a plurality of electric motor powered ducted fans of one size;

an additional first group of electric motor powered ducted fans of a smaller size;

an additional second group of electric motor powered ducted fans of a smaller size;

one or more batteries;

a means to sense the distance to the ground at a plurality of positions on the aircraft surface;

a means to measure the acceleration of the aircraft in 3 directions at a plurality of positions on the aircraft surface;

one or more on-board microcomputer systems connected to the electric motors and to the means of distance and acceleration measurement;

wherein the electrical power from the batteries supplied to the larger electric ducted fans is controlled by the microcomputer in such a way as to assure approximate vertical equilibrium during the VTOL phase, the electrical power supplied to the first group of smaller electric ducted fans is controlled by the microcomputer in such a way as to provide rapid corrections of the craft attitude and vertical position to that required and the electrical power supplied to the second group of smaller electric ducted fans is controlled by the microcomputer in such a way as to provide corrections of the craft's horizontal position and to its horizontal angular position to those required.

According to another aspect of the present invention there is provided an aircraft comprising:
  a plurality of small electric motor powered ducted fans;
  one or more batteries;
  a means to sense the distance to the ground at a plurality of positions on the aircraft surface;
  a means to measure the acceleration of the aircraft in 3 directions at a plurality of positions on the aircraft surface;
  an on-board microcomputer system connected to the electric motors and to the means of distance and acceleration measurement;
  a foldable aerofoil;
  a thrust-vectoring means;
  wherein the electrical power supplied to the electric ducted fans from the batteries is controlled by the microcomputer in such a way as to control flight stability during VTOL operation and
  wherein the foldable aerofoil is automatically deployed in transition from VTOL to linear flight and the thrust vectoring means is used to divert thrust from the ducted fans to create linear thrust.

According to another aspect of the present invention there is provided a VTOL aircraft comprising:
  a plurality of small electric motor powered ducted fans;
  one or more batteries;
  a means to measure the acceleration of the aircraft in 3 directions at a plurality of positions on the aircraft surface;
  one or more on-board microcomputer systems connected to the electric motors and to the means of acceleration measurement;
  wherein the electrical power supplied to the electric ducted fans from the batteries is controlled by the microcomputer in such a way as to control flight path and flight stability.

According to another aspect of the present invention there is provided VTOL aircraft comprising:
  a plurality of small electric motor powered ducted fans;
  one or more batteries;
  a means to sense the distance to the ground at a plurality of positions on the aircraft surface;
  a means to measure the acceleration and rotation of the aircraft in 3 directions;
  one or more on-board microcomputer systems connected to the electric motors and to the means of distance and acceleration/rotation measurement;
  wherein the electrical power supplied to the electric ducted fans from the batteries is controlled by the microcomputer in such a way as to control flight path and flight stability.

According to another aspect of the present invention there is provided a VTOL aircraft comprising:
  a plurality of small electric motor powered ducted fans;
  one or more batteries;
  a means to measure the acceleration and rotation of the aircraft in 3 directions;
  one or more on-board microcomputer systems connected to the electric motors and to the means of acceleration/rotation measurement;
  wherein the electrical power supplied to the electric ducted fans from the batteries is controlled by the microcomputer in such a way as to control flight path and flight stability.

By employing electric thrust producing technology instead of conventional internal combustion or gas-turbine thrust producing technology the present invention discloses a method and apparatus for producing improved and safer VTOL aircraft. It also provides a method for providing an improved transition between linear and VTOL flight.

Methods and apparatus for providing superior electrically propelled VTOL aircraft are disclosed.

A conventional ducted-fan VTOL vehicle seeks to use active vane control of the airflow to produce stable ascending and descending flight as well as to effect transition into and out of conventional linear flight. In a conventional arrangement (see FIG. 1) four ducted fans are used—this is because each fan usually requires a corresponding engine. Since internal combustion engines are relatively heavy and voluminous the fans are constrained to be greater than a certain size. Their number is likewise constrained in order for a viable thrust/weight ratio to be attained. These constraints put further constraints on the operating stability and on the safe operation of the vehicle.

With only four fans it is difficult to maintain stable and level flight at all times due to dynamic changes in airflow and pressure around the craft. In addition, failure of one engine can be realistically expected to lead to unstable flight as the vehicle will simply become unbalanced. Furthermore, the time response for the required compensating power increase in the remaining three relatively large engines, even if balance could be maintained, would be too slow.

The solution that is proposed according to the preferred embodiment is to employ a plurality of much smaller ducted-fans driven by electric motors. By using many smaller ducted fans distributed over the aircraft, balance may easily be maintained if one of more engines is lost. In addition, since there are many engines then the loss of any one-engine only represents a small percentage loss in thrust. The response time for changing the thrust magnitude and direction of such a small electric fan is also fundamentally much shorter. This means that dynamic changes in air pressure and air-flow as well as other dynamic loads can be compensated for more rapidly and over a smaller space scale. This leads directly to a vehicle that is capable of being controlled in a much more stable manner in the presence of variable dynamic loads. It also leads to a much safer operation as the failure of even multiple ducted fans necessitates, only a small increase in thrust from the remaining fans. Such a small increase can be produced much more quickly given the smaller inertia of the smaller electric fans. In addition, the fact that the ducted fans employed are so small allows the thrust to be controlled purely through regulating the electrical power flowing to the motor. This is a great simplification over conventional systems which employ controllable vane systems.

In addition, the probability of failure of a small ducted fan is intrinsically smaller than that of a large ducted fan as all components are smaller, lighter and subject to lower forces. The nature of the electric motor also eliminates the need for converting the linear motion of the internal combustion engine into rotary motion. Furthermore, it eliminates the need for gearboxes due to a superior torque characteristic. These facts further diminish the risk of failure of a single small electrically driven ducted fan.

As discussed above, increasing the number of ducted fans is extremely difficult using internal combustion engine technology. Due to the weight/power scaling and power/cost scaling of these engines, using multiple engines must be considered fundamentally problematic as the aircraft will become too complex and too heavy. However electric ducted fans do not suffer from such scaling problems and small brushless electric motors are cheap, powerful and extremely light. For example, a model 2280 motor from LEHNER weighs just 800 grams and yet can produce around 5 kW of power at over 80% efficiency. Many brushless designs now exceed 90% efficiency. The fans themselves are usually made from composite materials and are also extremely light. For example, a modern electric ducted fan giving over 100 N of static thrust at 7.5 kW weighs only 1.2 kg.

Using small numbers of large ducted fans and a plurality of separately controllable independent vane systems might appear to offer an alternative solution to the problem. However, such a system suffers from the fact that each independent vane system will in general cause an aerodynamic back reaction into the ducted fan which will then affect the entire air outflow. In addition, the combined movement of different vane systems will in general set up pressure and flow instabilities within the ducted fan causing unstable operation and unstable thrust. The incorporation of multiple vane systems will also lead to significantly decreased thrust efficiency as the vanes cause a considerable drag even when not deflecting the air flow. In addition the system complexity is significantly increased by the inclusion of multiple vane systems. Furthermore, all vane systems, even simple ones, intrinsically link thrust in one direction with thrust in other directions and hence proper thrust control is by definition significantly more complex.

The use of many independent small ducted fans avoids many of these problems as the response time of such small fans is fast so that thrust control may be produced simply by control of the motor power, completely obviating the need for a complex vane-based system.

Current electrical energy storage technology is, however, less efficient than energy storage in fossil fuels, For example petrol can store approximately 45 MJ/kg whereas current battery technology stores somewhat less than 1 MJ/kg. Internal combustion engines are, however, about 5 times less efficient than electric motors in conversion to kinetic energy and hence it may be concluded that currently electrical energy is in fact at best 9 times heavier to transport in an aircraft than petrol.

Notwithstanding the above there are several mitigating facts here. The first is that electric motor drives can be constructed to be much lighter than internal combustion motor drive systems. Additionally electrical power may be produced and stored either by hydrogen fuel cells or via an on-board internal combustion or gas-turbine engine linked to an electrical generator if greater autonomy is required.

Another extremely pertinent fact is that currently an enormous effort worldwide is being focused into developing the technology of electrical energy storage as the world tries to abandon the wide-scale use of fossil fuels. Electrical cars will require lighter and more powerful batteries. So too large-scale electrical energy storage will be required for solar, wind and wave generators that produce energy in a non-continuous fashion. With such enormous effort being concentrated in this field it must be regarded as being extremely likely that within the next few years significant progress will be made in increasing the energy density beyond 1 MJ/kg of current battery technology and in fundamentally decreasing the price. One pertinent example is the recent super-capacitor of EESTOR who claims to have reached the 1 MJ/kg figure. Another is the work of St Andrew's University on air-breathing batteries. This group has already demonstrated in a laboratory environment an eight-fold advantage over the best commercial batteries.

Various aspects of the present invention will now be described, by way of example only, and with reference to the accompanying drawings in which:

FIG. 1A is a schematic figure of a known VTOL ducted-fan technology wherein the craft's four ducted fans are driven by internal combustion engines and are rotated to provide essentially vertical thrust for take-off and landing, FIG. 1B shows the craft rotating the ducted fans to produce a horizontal component of thrust so that the craft can accelerate both vertically and horizontally and FIG. 1C shows the craft having transitioned to linear flight and wherein vane systems are used in each nacelle to correct for flight instability;

Figure 3:
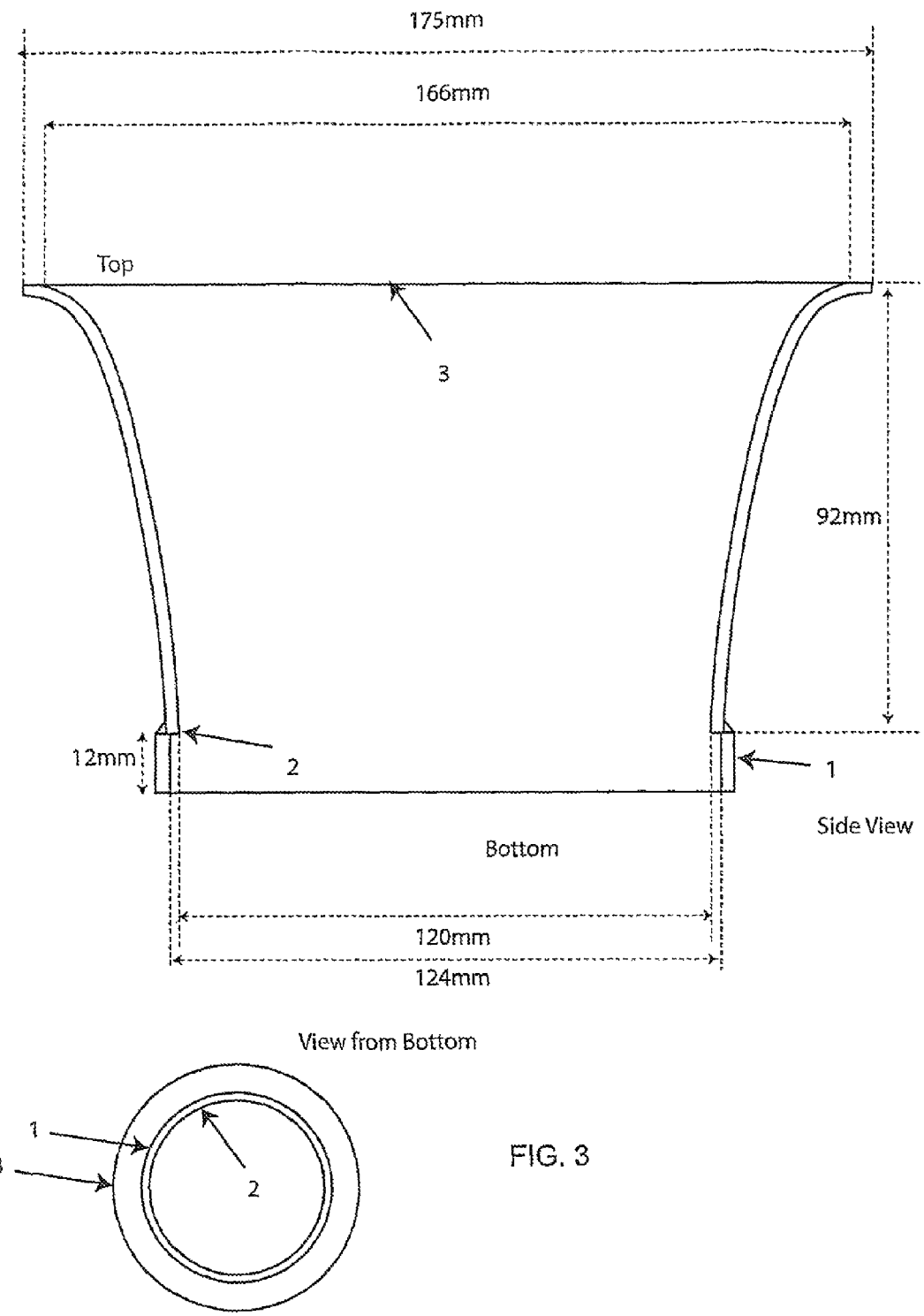
FIG. 3 shows a carbon-fibre inlet for an electric ducted fan according to a preferred embodiment.
Figure 4:
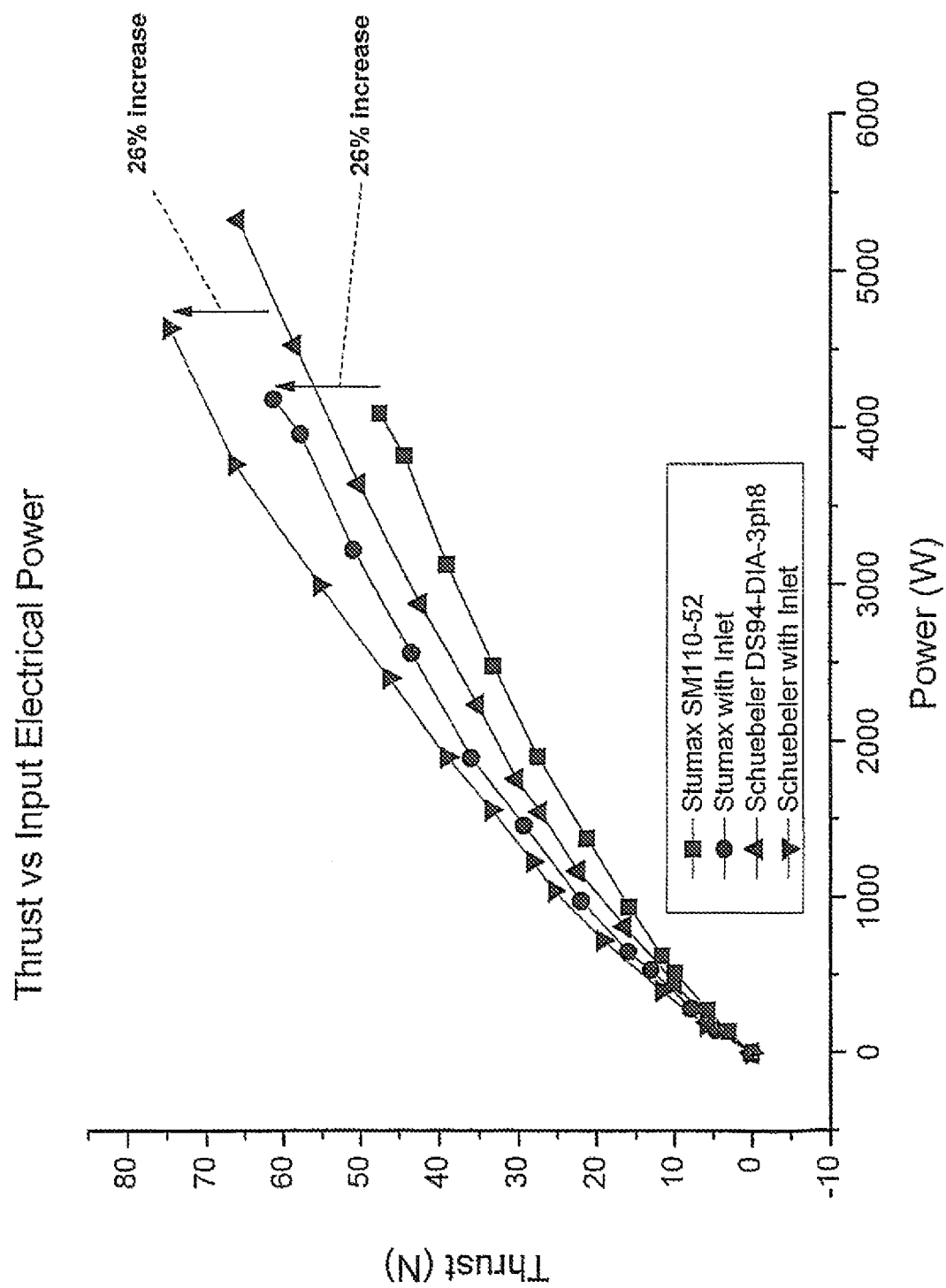
Figure 5:
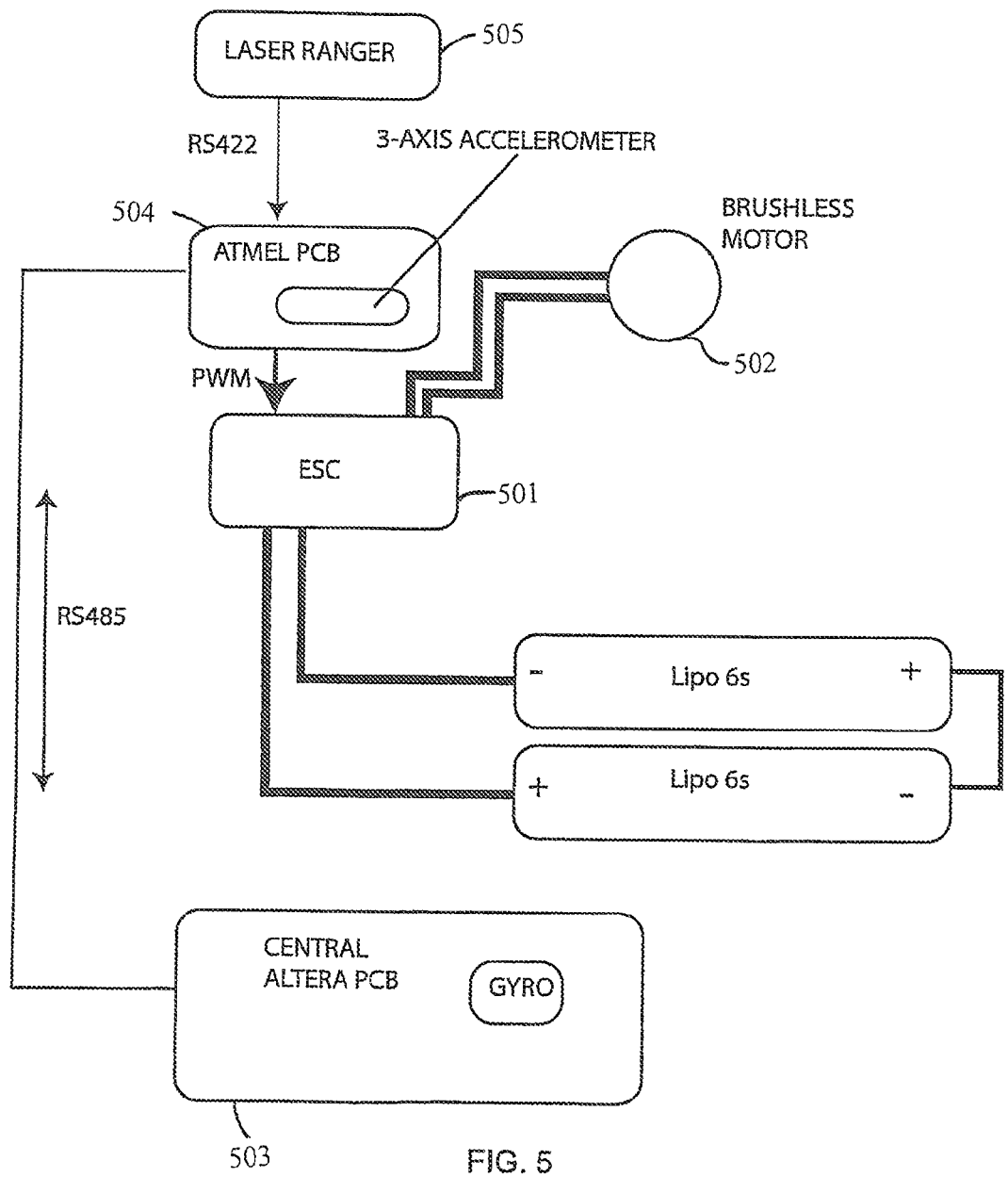
Figure 6A:
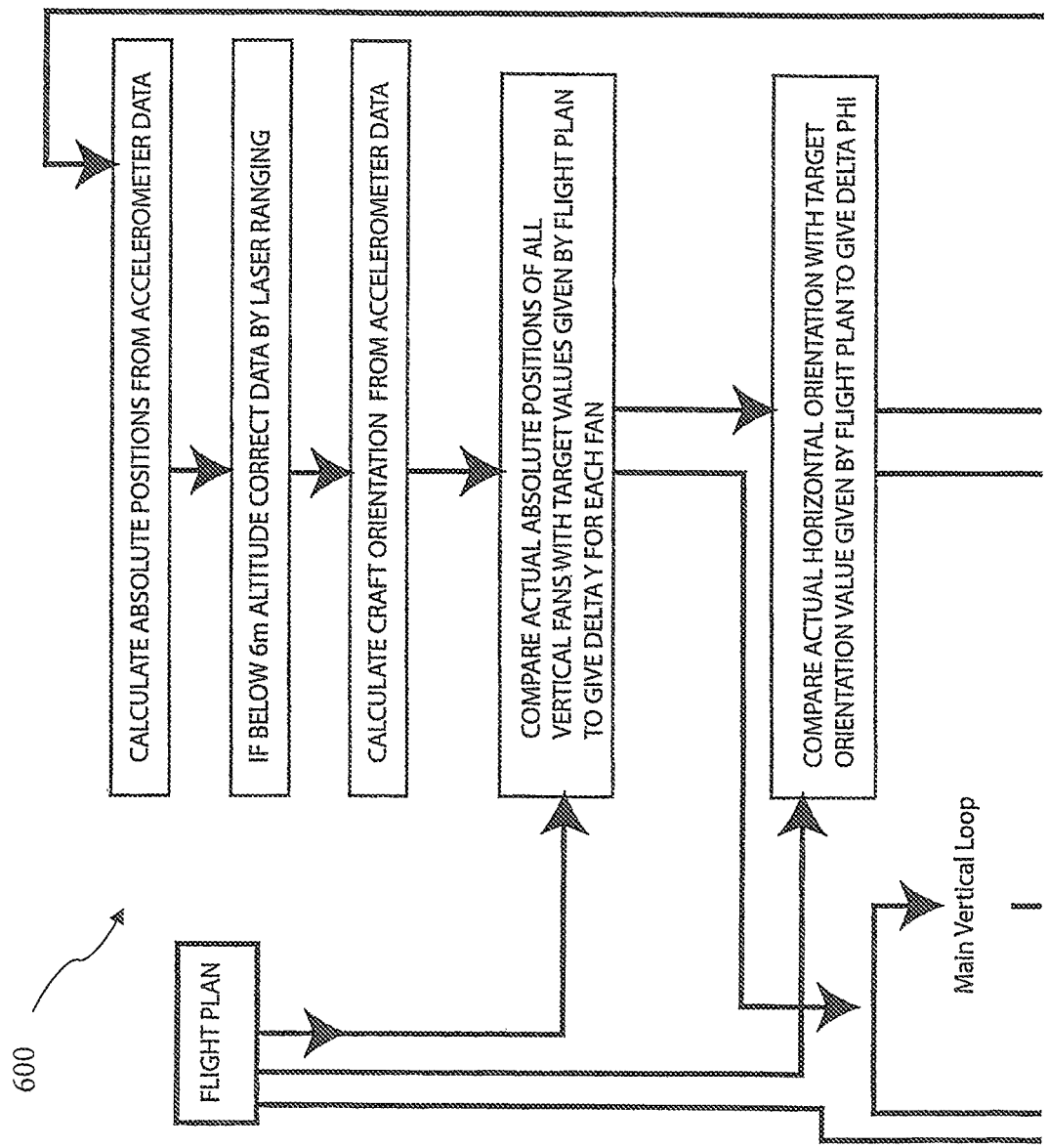
Figure 6B:
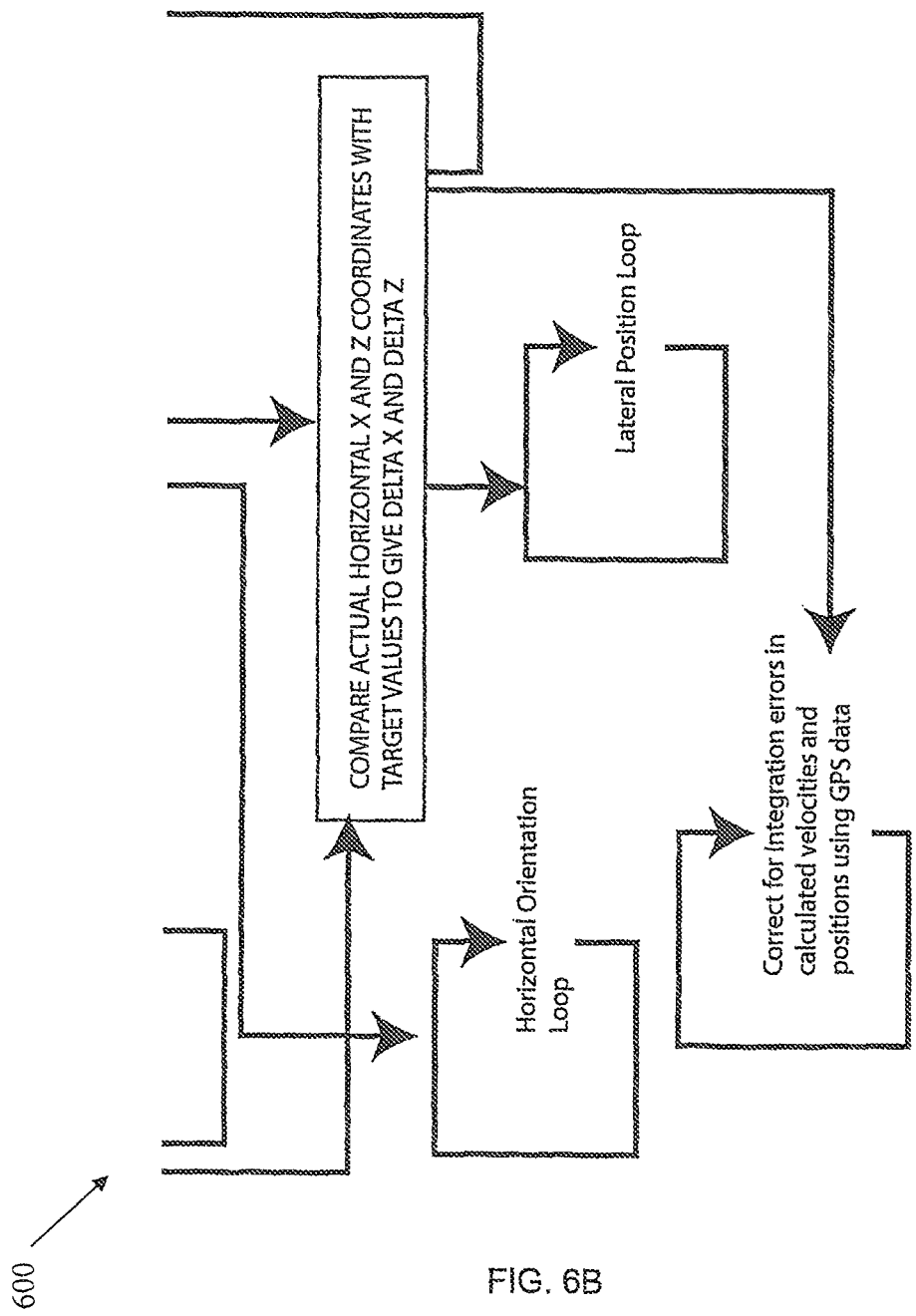
Figure 8:
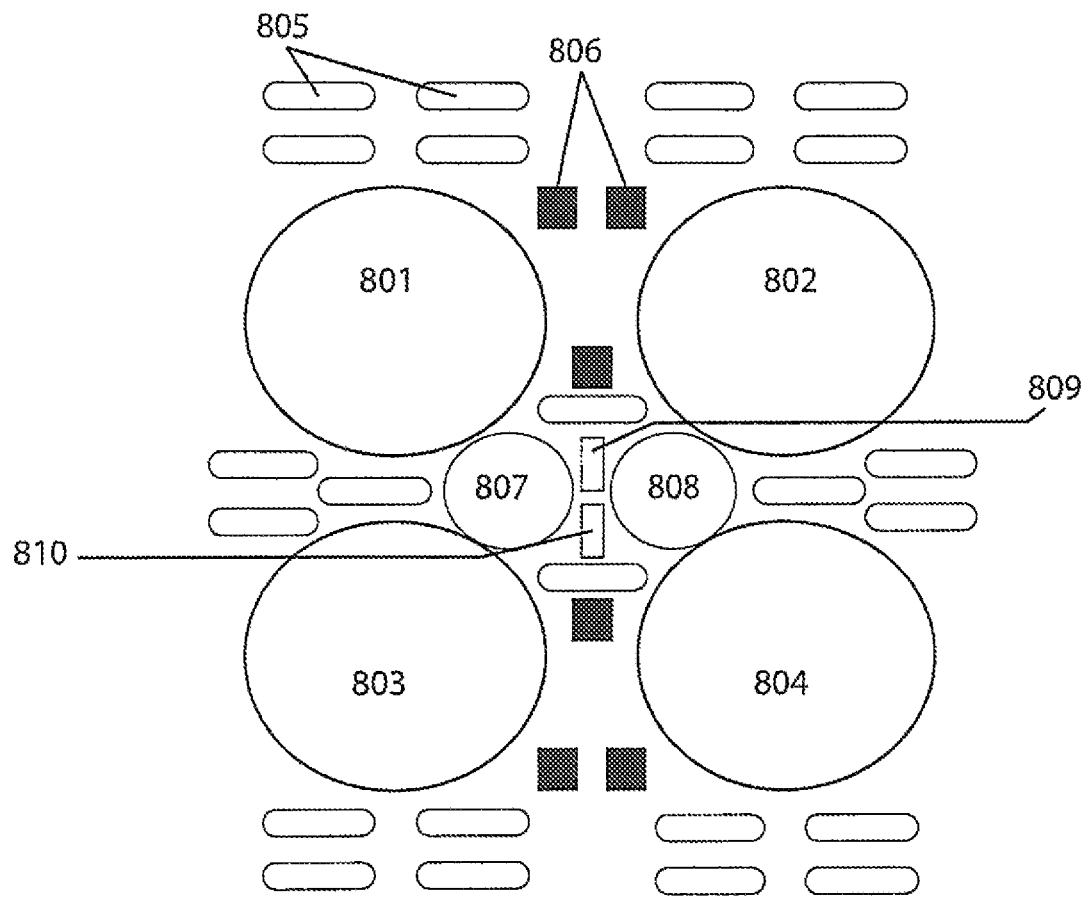
Figure 9:
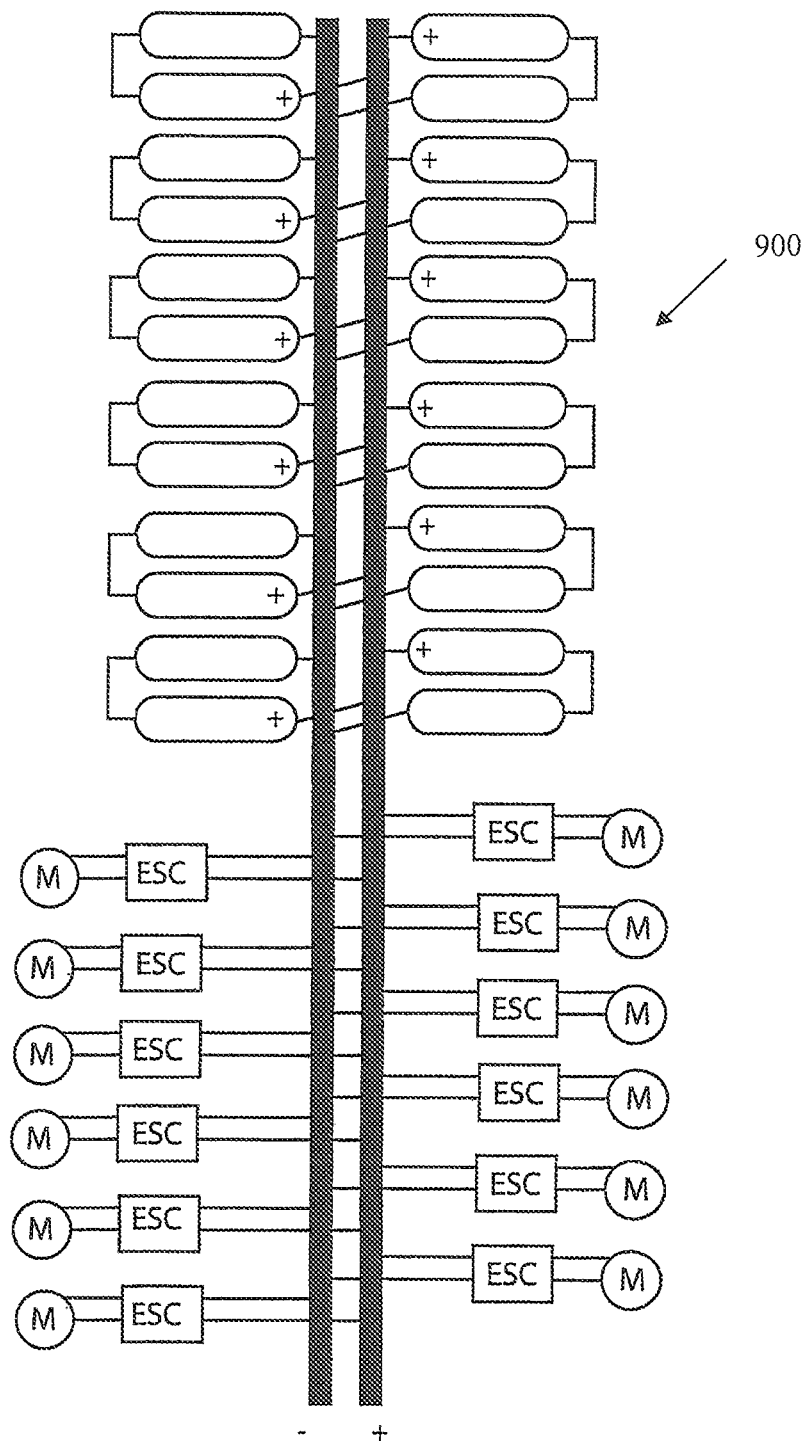

FIG. 4 shows a graph of the measured static thrust vs. input electrical power of two different models of electric ducted fan (an un-modified SCHUEBELER DS-94-DIA-3ph with LEHNER 2280 motor and a STUMAX 110-52 with Neu 1915-1Y motor) with and without inlet ducts wherein batteries were 2×6s FlightMax 5000 mAh LiPo in series, ESC used was SCHULTZ FUTURE 40.160, static thrust was measured in a bench-top rig using an Imago force meter, electrical power was measured by FLUKE voltmeter and ammeters and wherein the inlet of FIG. 3 was used for the SCHUEBELER fan and a similar inlet was used for the STUMAX fan but with a slightly smaller collar to enable fitting to the smaller diameter (110 mm) of this fan and wherein the front inlet diameter of both inlets was the same and the length of both inlets was the same;

FIG. 5 shows a schematic diagram of the control circuits according to a preferred embodiment;

FIG. 6 shows a simplified schematic diagram of the flight control logic used according to a preferred embodiment;

FIG. 7A shows a view from top of a second embodiment comprising a compact 2-passenger electric VTOL aircraft and FIG. 7B shows a side view;

FIG. 8 shows the vertical fan group used in the second embodiment comprising four large fans and two smaller fans; and FIG. 9 shows an alternative electrical distribution scheme.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not be construed as necessarily advantageous over other embodiments. The detailed description includes specific details for the purpose of providing a thorough understanding of the present invention. However it will be apparent to those skilled in the art that the present invention may be practiced without these specific details. In some instances, well-known structures and devices are shown in block or simplified form in order to avoid obscuring the concepts of the present invention. Acronyms and other descriptive terminology may be used merely for convenience and clarity and are not intended to limit the scope of the invention.

Electric VTOL Drone

General

Figure 1:
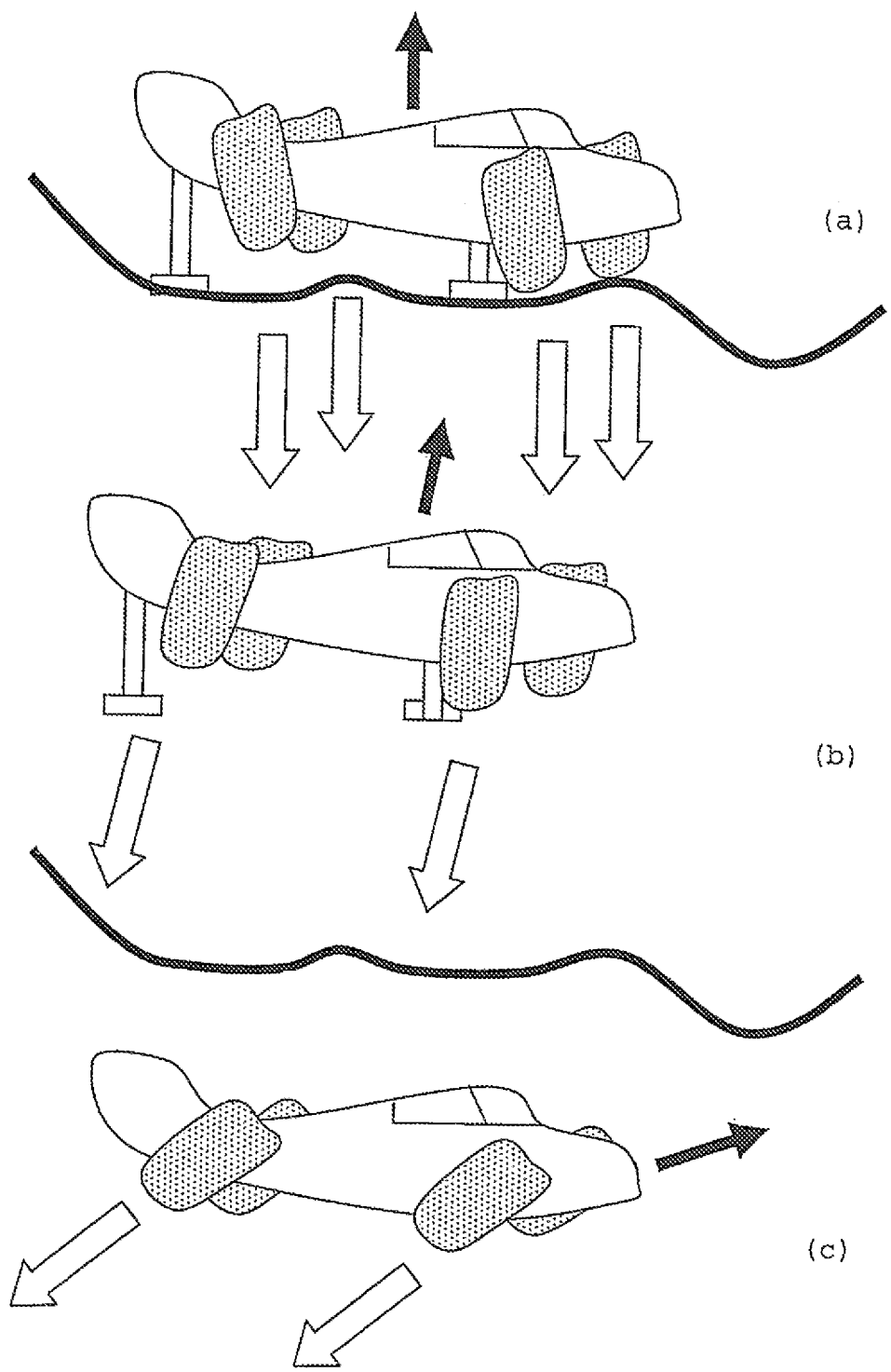
Figure 2A:
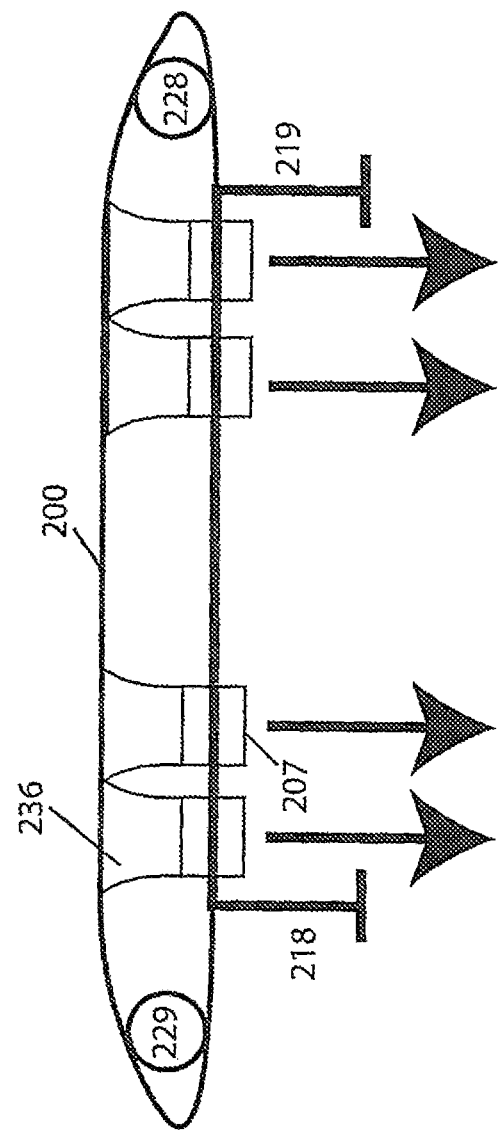
FIG. 2A is a side view and schematic diagram of a preferred embodiment and shows a small VTOL aircraft employing eight small vertically mounted electrically driven ducted fans and four laterally mounted ducted fans.
Figure 2B:
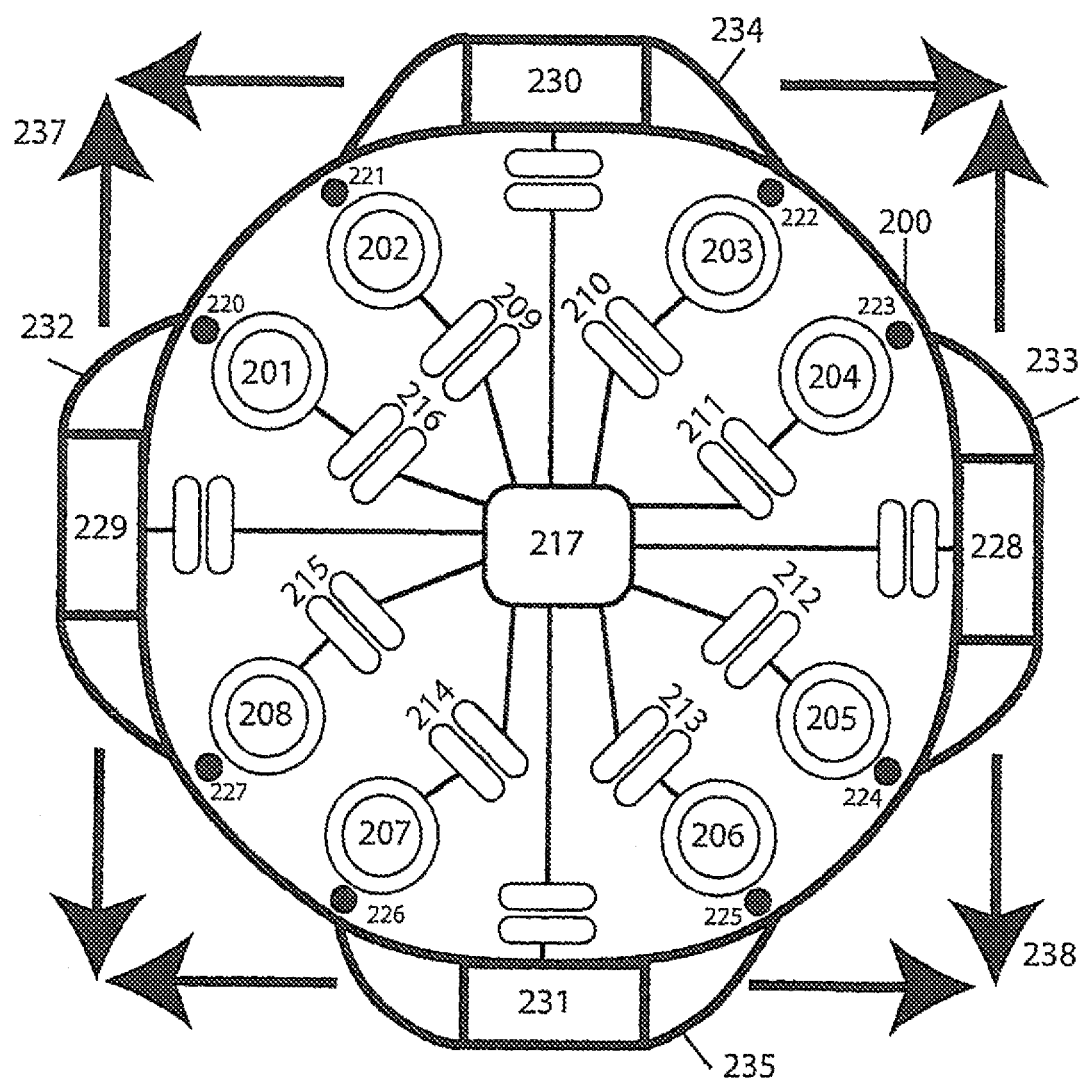
FIG. 2B is a view from the top.

FIG. 2A and FIG. 2B shows a schematic diagram of the preferred embodiment of the invention. FIG. 2B shows an overhead view of a small demonstration-of-principle quasi-saucer-shaped electric VTOL drone 200. The diameter of the drone is 140 cm. The thickness at the centre-point is 28 cm. Eight 12 cm diameter carbon-fibre electric ducted-fans are vertically mounted to carbon-fibre inlet ducts at equal intervals around the periphery of the drone 201-208. Four further identical ducted fans 228-231 are mounted laterally within carbon fibre nacelles 232-235. FIG. 2A shows a view of the craft from the side with four of the vertical fans (e.g. 207) depicted and two of the lateral fan nacelles 229,228. The craft is built around a carbon fibre and aluminium structure and is covered by a smooth aerodynamic carbon fibre shell which also acts as an aerodynamic lifting body.

Electric Ducted Fans ("EDFs") and Lithium Polymer Batteries

The ducted fans are modelled around SCHUEBELER DS-94-DIA-3ph fans and are only slightly modified from this commercial design in order to increase the motor cooling efficiency. Each fan uses a LEHNER 2280 motor which is driven by 12s Lithium Polymer battery packs. Each pack produces 44.4V-50.4 V at a maximum current of approximately 120 amps with a measured usable capacity of 772 kJ. Each battery pack is collocated next to its motor to reduce the use of heavy high-current wires. Each battery pack comprises twin series-connected FLIGHTMAX 6s batteries 209-216 rated at 5000 mAh each and weighing 2×780 g.

Inlet Ducts

Each vertically mounted fan is matched to a specifically designed inlet made from carbon fibre and weighing 125 g. The purpose of this inlet is to minimise turbulence in the in-flowing air and to maximise the mass flow while minimising the inlet flow speed. This leads to a 26% increase in the observed static thrust produced per kW in each fan. A typical inlet is shown in FIG. 3.

FIG. 4 shows the measured static thrust vs. input electrical power characteristics of two different models of electric ducted fan (an un-modified SCHUEBELER DS-94-DIA-3ph with LEHNER 2280 motor and a STUMAX 110-52 with Neu 1915-IY motor) with and without inlet ducts. Both fans give a 26% improvement in static thrust when paired with these inlets.

Each vertically mounted ducted fan of the preferred embodiment when matched to its inlet produces a thrust of around 20 N/kW of input electric power with a maximum thrust of 85 N. The weight of each fan including motor is approximately 1 kg. The weight of each battery pack is approximately 1.5 kg. The useful vertical static thrust per fan is, therefore, approximately 60 N at full power giving almost 500 N in total. As can be seen from FIG. 4, the efficiency of the fans is not precisely linear and falls somewhat at high values of static thrust.

Electronic Speed Controllers

The vertically mounted electric ducted fan ("EDF") motors are controlled by individual brushless motor Electronic Speed Controllers ("ESC") located next to each motor. Preferred electronic speed controllers include the POWER JAZZ 63V KONTRONIK ESC, the SCHULTZ FUTURE 40.160 ESC and the TURNEGY MONSTER ESC. Any of these units work well. An additional cooling fan may be used with the SCHULTZ FUTURE 40.160 to avoid overheating. Typical weights of these units are between 100 and 200 g. The control circuitry/preset options of each ESC are generally optimised for the best rate of change of thrust and the best thrust stability. In bench-top tests at higher RPMs a value of 40 N/s has been measured for the typical maximum rate of change of thrust achievable. Typical time delays from an instruction to change thrust to an actual thrust response are 0.1-0.15 s with any of the above ESCs and the LEHNER motor.

Lateral Fans

The laterally mounted fans are preferably matched to nacelles that have been hydrodyamically modelled to produce good dynamic thrust. This is because these fans need to operate efficiently at high speeds when the craft is in lateral movement. Accordingly, a higher airflow speed is required than with the vertically mounted fans.

Flight Control

The flight profile is preferably uploaded prior to flight into a printed circuit board ("PCB") based on an ALTERA field-programmable gate array ("FGPA") (EP3C16Q240C8) with a soft-core VHSIC ("very high speed integrated circuit") hardware description language ("VHDL") NIOS microprocessor and VHDL logic to handle RS485 ports, ADIS16260 gyroscope and microprocessor interfaces. The board has 32 MBytes of SDRAM and 8 MBytes of FLASH memory and is located in the central compartment 217. This board communicates (using RS485 at 460800 baud) with separate PCBs, one for each motor based on the ATMEL AT32UC3A0512 chip which in turn control the ESCs using standard PWM signals. Each of these latter boards contains a three-axis microelectromechanical systems ("MEMS") ADXL345BCCZ accelerometer from ANALOG DEVICES. The function of the secondary ATMEL boards is to relay measurements every 5 ms of acceleration and laser ranging data to the central ALTERA board. In addition, these boards generate the PWM signals required to control the brushless motors. Otherwise all processing is done in the ALTERA.

Laser Ranging Data

Eight laser ranging time-of-flight sensors (MICRO-EPSILON ILR 1100-6) using 900 nm pulsed laser diodes are installed at positions 220-227 next to each vertically mounted ducted fan and next to each AT32UC3A0512 PCB in order to accurately measure the exact vertical distance from each ducted fan to the ground. The output of each sensor is fed via RS422 to the AT32UC3A0512 PCB. During take-off and landing phases a simple feedback loop running on the ALTERA PCB controls the thrust of each vertical fan such that all measured distances increase or decrease uniformly together.

Control for Level Flight, Take-Off and Landing

A twin loop iteration algorithm is used for each pulse width modulation ("PWM") controlling signal. The outer loop specifies how the height of each fan is required to evolve as a function of time through the definition of a dynamic target height. An inner loop then changes the PWM signal to each motor in order to achieve a particular command height. Typically, an inner loop of the following type is used:

$$T_{i+1}^j = T_i^j + \alpha_1(y^j - y_T^j) + \alpha_2 v_y^j + \alpha_3 a_y^j + \alpha_4 \int_{t_0-\Delta t}^{t_0} (y^j - y_T^j) dt. \quad (1)$$

where $T_{i+1}^j$ is the new PWM value for jth vertically mounted fan, $T_i^j$ is the old PWM value, $y^j$ and $y_T^j$ are respectively the measured values of height above ground at the jth fan and the target height of that fan.

The parameters $v_y$ and $\alpha_y$ are respectively the measured velocity of the jth fan and its measured acceleration. The parameter $\Delta t$ is a time which determines the integration period. The four a values are iteration constants which depend on the load characteristics of the craft and its forward velocity (as essentially this changes the load via aerodynamic lift).

These constants and the value of Δt are therefore updated by the ALTERA during different flight regimes. They are, however, initially set according to the static weight of the craft at take-off. If these constants are not chosen correctly the craft may become unstable.

The constants are chosen for every flight regime by simulation on a PC using Fortran 90 of the performance of the craft in modelled (noisy) air-flows and using the above algorithm. The program is designed to calculate the best coefficients for a given static weight and a given lateral airflow. The results are then used to form a look-up table which is programmed into the ALTERA board. This table is then used by the ALTERA to update the coefficients when the flight regime or load changes.

During take-off the eight distance measuring sensors preferably determine the vertical distance of each ducted fan to the ground. The controller sets a desired height vs. time profile for each fan and the above algorithm then ensures that the craft follows this profile regardless of external forces such as wind and varying load.

Strong gusts of wind may create a momentary error in the desired height of a particular fan as the current ESC/fan combination has an intrinsic response time of around 0.1 to 0.15s and so within this time the craft will not be able to counter this external transient. However, using the type of control algorithm described above it has been observed that the drone can be made to lift off and maintain level flight with an attitude accuracy of a few degrees in normal conditions. The ALTERA controller can be programmed for rapid or slow vertical take-off. Landing is handled in a similar manner. Reduction of the intrinsic time delay is possible using a different ESC using motor sensors which enables results in improved flight stability in gusty conditions and the ability to perform even faster flight maneuvers.

Accelerometer Data

The laser time of flight sensors produce reliable data below 6 m altitude. However, even below this altitude a small horizontal translation of the craft may bring it over some higher ground or over an obstacle leading to an anonymously high reading on one or more of the sensors. Since the craft forms a rigid body the case of the craft drifting over an obstacle can be easily identified by the software and recalibration effected. However, some obstacle geometries are more difficult and cannot be distinguished from the case of the craft legitimately changing its attitude. A secondary system is therefore also employed that is based on a three-axis MEMS ADXL345BCCZ accelerometer from ANALOG DEVICES mounted on each of the eight AT32UC3A0512 PCBs. The software uses a merit weighting system running on the primary ALTERA controller to choose which height data is more reliable. It preferably constantly recalibrates the less reliable height data to the more reliable data. Reliability is decided by a number of constraints. For example, above 6 m altitude the accelerometer data is given unit reliability and the ranging data zero. Between 3 m and 6 m a falling scale applies to the ranging data. When only one set of ranging data shows a very rapid change it is given a zero reliability rating and recalibrated with accelerometer data as it is clear that such an occurrence is aphysical. Various rules of this type, which can be increasingly complex, can be programmed and in general the more complex the rule set the better will be the performance of the vehicle in complex environments and in gusty conditions.

Details on Flight Control

The accelerometers are always used to provide acceleration data to the algorithm of Eqn. 1. This is because double numerical differentiation using backward time-differencing of the laser ranging data cannot produce an accurate low-noise estimate of the acceleration at a given time. Care must be taken to correct the accelerometer data for tilt of the craft. A constant record on the craft orientation is kept by the ALTERA for this and other purposes. The craft orientation is calculated by using time average data of all accelerometer signals and correcting for instantaneous dynamic acceleration.

Velocity information for the algorithm of Eqn. 1 is calculated by both backward differencing of the laser ranging data and by integration of the acceleration data. A merit system is applied to calculate the actual value used.

The eight ADXL345BCCZ 3-axis accelerometers measure accelerations in all three directions from 0 to 15 g down to a resolution of +/−3 mg. From take-off the ALTERA processor begins integrating data from these sensors to provide a secondary measure of the vertical height of each lifting fan to the ground. The ALTERA is also programmed to calculate the average height, vertical speed and vertical acceleration of the craft as calculated by an average of all the integrated and raw vertical accelerations available. Likewise, it produces digital outputs for the horizontal position (x and y), horizontal velocities and horizontal accelerations. Finally, it produces outputs for angular position, angular rotation and angular acceleration about the x, y and z axes at the centre of the craft by comparing accelerations in laterally opposed accelerometers.

Lateral (i.e. horizontal positional) and horizontal rotational (i.e. yaw) flight control adjustments are preferably calculated directly by the ALTERA controller using accelerometer data. A single-axis ANALOG DEVICES ADIS16260BCCZ gyro, mounted on the central ALTERA board, is also used to measure yaw. This signal is integrated to give a further measure of lateral direction.

During any phase of flight the main ALTERA flight program specifies a time sequence target of desired lateral and horizontal rotational movements. Similar algorithms to Eqn. 1 are then used to iterate the thrust of the 4 lateral fans to achieve these targets.

Below 6 m altitude, both laser ranging and accelerometer data are used for vertical flight and attitude (i.e. pitch and roll) control. Once the distance to ground is greater than 6 m, vertical flight and attitude control are also then switched to accelerometer input.

Similarly, during the landing phase the drone preferably switches progressively to distance measuring sensor data for vertical flight and attitude adjustments between 6 m and 3 m to the ground.

The control system described above allows extremely flexible VTOL operation and the maintenance of a highly stable aerial platform. Transition can be made to linear flight by direct use of two of the lateral fans (i.e. 228 and 229) driving the craft forward in any direction required. In linear flight, level and stable operation is assured by the ALTERA setting a target height for each of the fans and then using Eqn. 1 to constantly update the vertical fan pulse width modulation (PWM) signals such that the height targets are attained. Except for low level flight below 6 m all data required comes from the accelerometers. Different target heights may be set to insure a tilt of the craft in a particular direction. This enables the optimisation of aerodynamic lifting forces for linear flight by accurate setting of the craft's angle of attack. In addition the setting of differential height targets is also used in braking and turning maneuvers where aerodynamic assistance is required.

Management of Torque

Of the eight lifting fans 201-208 four are constructed with normally rotating fans and another four are constructed with counter-rotating fans. The order is interlaced in pairs so that as one proceeds around the craft two fans rotate in the positive direction, then two in the negative direction and then two positive again. This reduces the average torque on the craft. Residual torque is corrected for by running pairs of oppositely mounted lateral fans in reverse directions or by boosting thrust on diagonally opposed fans of one rotational direction whilst decreasing thrust on diagonally opposed fans of the other rotational direction. By way of example, in the first case fan 229 may be made to produce a thrust in a direction 237 and fan 228 may be made to produce a thrust in direction 238 thus producing a torque about the centre vertical line of the craft. In the second case fans 201, 202, 206 and 205 rotate in one direction and fans 203, 204, 207 and 208 rotate in the other direction. A torque about the vertical axis may then be corrected for by diminishing the thrust of the first group of fans whilst increasing the thrust to the second group, keeping the total thrust constant. In either of these two cases a simple iteration is run to seek a target lateral direction.

The torque generated by the fans according to the preferred embodiment is relatively low.

The fans preferably possess an outlet duct comprising a series of twisted vanes that produce a hydrodynamic counter-force which significantly reduces the torque produced by the rotating blades. Nevertheless, torque is still observed and the above control procedures are extremely effective in controlling it.

Greater thrust per Watt can, in principle, be attained by eliminating such outlet ducts from an EDF. In this case the above control procedures become very important.

An alternative embodiment for the reduction of coupling of lifting thrust to rotation is to use contra-rotating ducted fans consisting of two sets of blades contra-rotating within the same duct.

The same problem of linear thrust to rotation coupling appears with the laterally mounted fans if each fan produces a net torque. For this reason, fans mounted parallel have opposite rotation.

By having both vertically and laterally mounted ducted fans the craft may be very precisely and independently controlled in all required axes of translation and rotation. This is very much in contrast to the case of a helicopter where control of translation is intrinsically coupled to rotation by a required change in attitude.

Transition to Linear Flight

Once the drone is well clear of the ground in general it uses its lateral fans to rotate horizontally until two of its fans are facing in the direction that linear flight is desired. These lateral fans are then energised creating forward acceleration in the required direction. The drone will quickly accelerate and (if required) climb along this direction. Course corrections are continually made at a rate of 10 times per second. A small GPS device (GlobalSat GPS EM-406A/OEM module 30×30×10 mm giving 1 fix per second and 1 ppm time signal (1s pulses, 1 ppm precision)) mounted in the central compartment 217 is now preferably used to correct continuously for integration errors accumulated from the accelerometer data.

As the drone accelerates it will feel an increasingly large lifting force due to its aerodynamic shape. The ALTERA controller is preferably arranged to alter the lifting thrust of the vertical fans to compensate for this aerodynamic lift according to the desired rate of climb encoded in the flight program held in its memory. It will also set a desired angle of attack as described above i.e. a differential thrust setting may be applied to the front fans with respect to the rear fans in such a way that the flight angle of attack is precisely controlled. This is in general optimised for best lift to drag performance but someone skilled in the art will clearly understand that different angles of attack may be required for different stages of a given flight mission.

Aerodynamic Braking

Rapid braking may be required for transition from fast linear flight to a controlled VTOL landing. The front vertical fans are preferably driven to maximum while the back fans are momentarily driven in reverse. This flips the craft to around 50 degrees to the horizontal and produces extreme deceleration, after which the craft may be brought to a controlled landing using the inverse procedure described above. This requires the use of reversible-thrust ESCs.

When employing such fast aerodynamic breaking it is important to keep accelerations below a certain maximum. The ESCs according to the preferred embodiment have a 0.1-0.15s response time and are able to change the thrust of a given fan by a maximum of 40 N/s. If the craft is made to rotate and accelerate too rapidly, then control may be lost due to there being insufficient time for the fans to produce the required thrust response to maintain stable flight.

It will be understood that linear flight is much less costly in terms of energy than VTOL flight. A major advantage of the present invention is that a craft can take off in complex surroundings and transition to high speed linear flight rapidly. By increasing the power of the lateral fans the transition time may also be reduced significantly.

An alternative less preferable solution to using separate laterally mounted ducted fans is to use vanes to siphon off some of the thrust of the vertical fans in order to achieve linear motion. Further and less preferably again one or more of the ducted-fans could be arranged to pivot or rotate providing vectored thrust.

Whilst in linear flight the craft may efficiently and accurately control its flight path by appropriate control of its 12 fans. Since the fans respond extremely quickly to thrust change commands from the ALTERA, active flight stability is easily realised even though the vehicle itself is, from an aerodynamic point of view, unstable. In fact the unstable nature of the vehicle leads to the advantage of practically quicker flight response.

Due to its symmetry and large number of fast response fans the current vehicle can do things that would be extremely difficult, if not impossible, for conventional vehicles to do such as to travel at high velocity in one direction whilst rotating.

The present craft is constructed from aluminium and carbon-fibre. The batteries weigh 18.7 kg and carry a usable energy of 9.3 MJ. The fans and their inlets contribute around 13 kg. Electronics contributes 3.5 kg. The total weight of the craft including structure and the carbon-fibre shell is 47 kg. The maximum vertical thrust achievable is 680 N. Average power burn on VTOL hover is 26 kW. Flight time in hover is around 6 minutes. Linear flight may extend up to greater than 20 minutes. Moderate vertical acceleration is possible allowing flight to significant altitudes. The ceiling altitude is effectively determined by the thrust lapse rate and remains untested. Maximum linear acceleration is approximately 0.3-0.4 g.

The specific flight control system 600 described above is summarized in basic form in FIG. 6 and serves to illustrate that stable flight operation from VTOL through to linear flight may be attained using the physical EDF configuration described here. It should be clear to someone skilled in the art that many different algorithms can be used for the purpose of flight control. In particular, the use of greater processing power to model in real-time the dynamics of the craft can be expected to significantly improve flight stability. In addition, the capability of many types of additional real-time measurements may be installed into the craft such as pressure sensors, wind sensors, cameras. The use of such information in parallel with a real-time computational model of the dynamics can of course also enhance performance, stability and safety. Someone skilled in the art will clearly understand these potential improvements.

Compact 2-Passenger VTOL Aircraft

General

Figure 7:
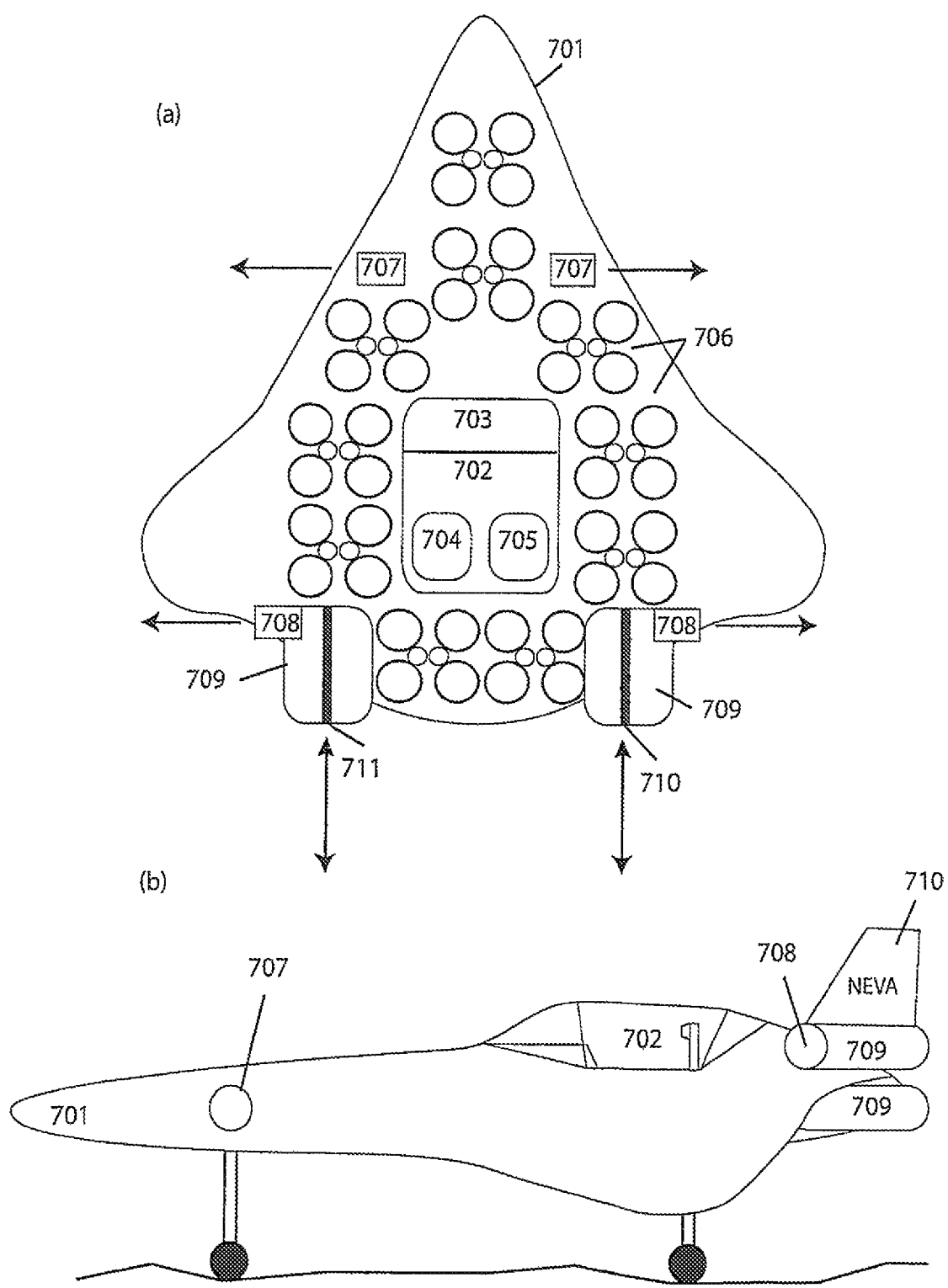

FIG. 7 shows a drawing of a second embodiment. This electric VTOL aircraft 701 is designed to carry 2 people short distances at low altitudes (<1000 m) in a stable and highly secure fashion. The structure and aerodynamic surface of the craft is made from carbon fibre. In total 60 electric ducted fans are installed (e.g. 706) for vertical thrust and 20 electric ducted fans for lateral thrust 707, 708, 709. All EDFs are mated in a smooth fashion to the aircraft skin through specially designed carbon-fibre ducts. There is a large cockpit 702 with two seats 704, 705 and instrument panel 703. The cockpit is protected by an electrically opening Plexiglas cover. Directional stability is improved by the two vanes 710, 711. An electrically retracting landing gear is also provided. The nose-wheel is controllable mechanically in order to facilitate ground movement. The aircraft is designed for efficient high-speed forward flight in one direction only and has been aerodynamically optimised to give an optimum lift to drag ratio at its design cruising speed of 180 km/hr.

The aircraft uses two types of EDF. The first (type-1) is the same type used in the preferred embodiment (EDF diameter 120 mm, max thrust 85 N, EDF+motor weight 1 kg). The second type (type-2) is a scaled up version with a diameter of 280 mm and using a custom 6 kW brushless motor. Being of a larger diameter this fan is capable of producing a static thrust of 150 N at a power of 5.3 kW when matched to a suitable inlet (370 mm inlet diameter). The weight of the motor and carbon fibre fan is 2.05 kg. Standard POWER JAZZ 63V ESCs from KONTRONIK corporation are used to control both the larger and smaller vertical fans.

40 type-2 fans and 20 type-1 fans are used as vertical propulsion units. 20 type-2 fans are used for lateral propulsion. Each fan is supplied by four collocated 6s Flightmax 5000 mAh LiPo batteries connected to produce 12s (i.e. battery A and B are connected in series, as are batteries C and D, then A+B and C+D are connected in parallel). The total battery energy is 125 MJ. The total craft weight without passengers is 570 kg. The battery weight is 250 kg and the combined EDF+motor+ESC weight is 160 kg. The carbon fibre structure, seating, instruments, control electronics and wiring weigh also 160 kg. The maximum vertical thrust attainable is 7700 N which allows a maximum take-off weight of 786 kg or equivalently a maximum passenger and baggage payload of 216 kg.

With two 75 kg passengers on board the VTOL autonomy of the craft is 7 mins. Maximum vertical acceleration thus loaded is 0.1 g at sea level under the standard values of atmospheric pressure and temperature (STP). Maximum lateral acceleration is 0.3 g. Autonomy under linear flight is 25 mins including one normal take-off and landing. Lateral cruising speed at 80% lateral power is 180 km/hr and the maximum range is around 70 kms. Power burn in hover mode is 295 kW.

Control Systems

The control systems employed in the second embodiment are extremely similar to those described in the preferred embodiment. However, since this is a passenger vehicle and flight safety is a prime concern, three independent ALTERA EP3C80F484C6 FPGAs with NIOS Processors (2×64 MBytes of DDRAM and 8 MBytes of FLASH) are used. In automatic flight mode, these ALTERA boards each carry a copy of the flight plan and each board generates identical target time-sequences of x, y and z positions of the craft as well as three angles specifying the craft's orientation. Identical iteration loops on each board then seek to follow these targets by changing the PWM signals as described in the preferred embodiment. A single-axis ANALOG DEVICES ADIS16260BCCZ gyro is included on each ALTERA board for horizontal orientation. A GLOBALSAT GPS EM-406A/OEM module is also connected to the three ALTERA for correction of world-line integration-based errors arising from accelerometer and gyro data.

Vertical Sub-System.

One PCB 809 carrying an ATMEL AT32UC3A0512 chip and a three-axis ADXL345BCCZ accelerometer is collocated and assigned to each group of six vertical fans. Each such group of six fans comprises 4 type-2 fans 801-804 and 2 type-1 fans 807, 808 arranged in the fashion shown in FIG. 8 (6s LiPo batteries are labelled 805, KONTRONIK POWER JAZZ ESCs are labelled 806). This PCB, which is located approximately at the geometric centre of the 6 fans is capable of controlling two motors independently. One of its PWM generators is connected to the 4 ESCs controlling the type-2 fans and one PWM generator is connected to the 2 ESCs controlling the type-1 fans. A laser ranging sensor 810 is mounted also at the geometric centre of each group of six fans and connected to the ATMEL PCB 809. In total there are 10 such groups of vertical fans controlled by 10 ATMEL PCBs. These PCBs communicate accelerometer data and laser ranging data to all three of the central ALTERA boards every 2 ms. In turn, each ALTERA board sends commands for two PWM signals to, each ATMEL board. The ATMEL board compares each of the two PWM commands received from the three ALTERA boards and if one of the three signals corresponding to one PWM is not the same as the other two then it is ignored. If all three signals for a given PWM control are different then all motors in the group are set to 75% power and a control failure error is sent to the pilot's control console. On landing the power is reduced to zero. Each ATMEL and ALTERA board is powered by its own power supply.

For vertical flight control the ten groups of vertical fans are controlled as in the preferred embodiment but with one major difference. On take-off, power to a given group is first applied to the two smaller fans. Power is initially set to 50% of maximum to these fans. Then the power to the other four fans is slowly increased until a height change is detected on the laser ranging meter assigned to the group. At this point the iteration sequence described in the preferred embodiment starts. However, only the PWM signal to the two smaller fans of the group is iterated using Eqn. 1. This is because the smaller fans have a faster response time than the larger fans and thrust may be changed more rapidly. An independent slower iteration loop with a time constant of 3-5 s is then used to subtract or add power from the small fans and to increase or decrease power correspondingly to the large fans so that on average the small fans oscillate always around 50% maximum power. The effect of this slow iteration never changes the total thrust—it just serves to always keep the small fans at approximately 50% power where they can respond most efficiently to height transients. Effectively thrust is then always injected into the small fans and then over a time period of 3-5 s this injected thrust leaks to the larger fans.

Lateral Sub-System

The lateral drive sub-system comprises four main thruster nacelles 709 each comprising a cluster of 4 type-2 fans mated to carbon fibre inlets and outlets that optimise dynamic thrust whilst not allowing static thrust to fall below 120 N at maximum power per fan. The four thruster nacelles are mounted two above the craft centre-line and two below giving a thrust exactly along the centre-line of the craft. At maximum power these four thruster nacelles produce over 200 kgf.

In addition to the four main thruster nacelles, four type-2 fans 707, 708 give lateral control of the fore and aft of the craft. The fans 707 employ curved inlets feeding from the top of the craft. The electrical control system for the lateral fans is identical to that of the vertical system except no laser ranging or accelerometer sensors are used on the ATMEL boards. The KONTRONIK POWER JAZZ 63V ESCs are used on the 4 lateral control fans and we have used our own custom reversible ESC for each of the 16 main thrusters. This is because it is extremely useful to have reversible control of the main forward propulsion unit.

Manual Operation by Pilot

In manual mode of operation a joystick is used to control the flight in the following way. Pushing the stick forwards produces an increasing velocity in the downwards direction. Pulling the stick back likewise produces an increasing upwards velocity. Pushing the stick to the right induces a rotation of the craft to the right. Likewise, pushing the stick to the left induces a rotation to the left. When in linear motion and propelled by two of its 4 sets of lateral fans this creates a turn. Forward motion is commanded by a foot-pedal as in a car and a reduction of velocity is effected by a further pedal similar to the brake pedal in a car. If one keeps pressing the brake pedal backward motion results.

For VTOL maneuvering a push-button on the stick changes the function of the left and right stick-tilt commands to command a left and right translation.

Manual trim levers allow one to set a given angle of attack by adjusting the targets for the various VTOL thrusters. In addition trim is available for yaw and roll (tilt).

By measuring the total electrical power consumed and by also measuring the speed through the GLOBALSAT GPS EM-406A/OEM module, a bar graph is displayed on the instrument panel constantly displaying km/MJ. By adjusting the elevation trim during linear flight this figure may be optimised. The 3 ALTERA boards also calculate and display maximum range remaining taking into account the energy burn required for a standard VTOL standing. When only 20 MJ of energy remain in the vertical batteries or when any one type-2 vertical fan battery pack falls below 30% capacity a cockpit warning sounds. All battery levels are displayed on the control panel as a bar graph.

Battery Load

The fans used in the craft have low resultant torque because they have been designed using vanes in the outlet to counteract the angular momentum produced by the rotor blades. As a result, lateral orientation control uses an iteration only changing the PWM settings of the four fans 707, 708. In addition the solution of what thrust to apply to what vertical fan group as a function of time in order to keep a certain orientation of the craft (such as a level orientation or a constant angle of attack) is fundamentally degenerate. Accordingly a long time-constant outer iteration loop is used to slowly even out thrust between the different groups as much as possible. This is important in the present case as a strategy of assigning separate battery packs to each motor has been chosen. It is therefore important not to over-use one or another motor. This connects with the problem of the arrangement of the vertical fan groups and how this should be optimised at design stage for the known range of centre of mass positions and the known centre of aerodynamic lift positions during forward motion. An optimum configuration is preferably used that leads to the most even battery depletion over static operation. A look-up table may be built that tabulates an optimum angle-of attack for a given forward velocity. An indicator on the control panel preferably constantly shows a merit figure for uniformity of vertical battery drain.

Larger Ducted Fans

Large exhaust flow speeds are useful for high-velocity linear flight propulsion but they are not required for VTOL applications where slow vertical speeds and high thrusts are needed. Generally the smaller the ducted-fan then the higher the velocity of the fan must be in order to attain a given thrust. However, near the sound speed efficiency falls off fast and so from a practical point of view the smaller the fan then the smaller the thrust that it will produce.

Large ducted fans can be very efficient in terms of static thrust per kW of input power. If a ducted fan comprises many blades which are designed to rotate slowly then a large mass flow within the fan may be achieved at the cost of only a small input power. A larger ducted fan can, in principle, achieve the same rate of change of momentum using a larger mass flow of air and a smaller input power than a smaller fan by creating a smaller change in air velocity. This is because the average power of the airflow in a ducted fan in the limit of no pressure change is given by $P=\frac{1}{2}\dot{m}v_{AIR}^2$ whereas the thrust is given by $T=\dot{m}v_{AIR}$ and hence the ratio P/T is essentially proportional to v (ignoring various subtleties).

So the larger the fan, then theoretically the larger the potential thrust per unit input power possible. However, the larger the fan is, the greater is the response time of the thrust to a change in input power. In the limit of too large a fan this leads to the impossibility of controlling a VTOL vehicle as thrust cannot be changed quickly enough to compensate for load, flow and pressure changes. There therefore exists an optimum size of ducted fan which allows an efficient thrust per unit input power and yet also allows a quick enough thrust response. Combining different sized fans as we have done in the second embodiment is also a good solution.

Brushless Motor Controllers

Overview

An important consideration in the preferred embodiment is the implementation of proper motor control. Currently available BLDC (Brushless DC motor) drivers are not really the best option for VTOL aircraft. These drivers are not always energy efficient to the level required by the application at hand. In addition, they are frequently neither weight nor volume optimized. The closest match is a BLDC driver designed for radio-controlled model aircraft (with some limitations—i.e. the technologies used in these drivers tend to be cheaper than the best available) such as the KONTRONIK POWER JAZZ 63V-120A model which we have used in the preferred embodiment. In fact there are a lot of very similar requirements to be met in the present application and the application of RC model aircraft (notably drivers must be both light and efficient). One thing of major importance however for VTOL applications is rapid revolution control. Very fast and accurate control of the ducted-fan thrust (which in effect means very fast and accurate control of the fan rpm) is not achievable with the KONTRONIK controller and as a result significant performance improvement is expected with the implementation of a customised driver design. Other important factors are operation at low rpm and fast and accurate start/stop capabilities.

Operation of Sensor-Less BLDC Motors at Low RPM

It should be noted that because sensor-less (no Hall position sensors) BLDC motors are commonly used, the only means of measuring the rotor position (which is essential for a BLDC driver) is via BEMF (back electromotive force). Because the BEMF is very low at low rpm, the driver must be optimized and tuned to the motor and load characteristics. The control algorithm in the primary ALTERA microcontroller should therefore preferentially arrange for all motors to rotate above their respective minimum rpm when quick and accurate thrust response is required (in order to enable efficient, fast and accurate motor control feedback via BEMF detection, a motor should operate above a certain minimum rpm required for proper BEMF detection). The ATMEL microcontroller should therefore ideally be programmed so as to preferentially choose motor thrust configurations that satisfy this condition.

A slightly different scenario is presented by the case of the lateral fans 228, 229, 230, 231. Here the operation may preferably be a little different. It is advisable to have these motors powered off during vertical takeoff and landing but at the same time it is required to have an ability to introduce rapid thrust corrections. So the control algorithm in the primary Atera microcontroller should preferably take into account that these motors are not able to deliver accurate thrust at short delay below a certain rpm (this is because the motor has to accelerate to its minimum speed when BEMF becomes active and then brake). Therefore, a high thrust low time activation of a motor may be used to produce the same impulse as a smaller thrust long time activation in situations where a rapid correction is necessary. However, this scenario does require significant breaking and for efficiency reasons energy recovered from braking should ideally be put back into the battery pack (rather than dissipated as heat—which is the case in most drivers).

Incorporation of Hall, optical or other types of sensor (internal sensor) into the motor (or into ducted fan assembly (external sensor)) offers an alternative way to achieve high accuracy rapid thrust control over the entire spectrum of thrust.

Driver Efficiency

Since BLDC motors for VTOL applications are likely to be operating under partial load conditions for a considerable amount of time, special care has to be taken in driver design. Simple trapezoidal voltage control is not sufficient to protect motors from overheating (the most common result of bad driving under partial load). It is therefore important that any driver incorporates current measurement and control circuits.

Current measurement should be realized as either a low ohm shunt resistor (which is a less preferable solution), or a current transformer (which is the preferable solution because of the very small associated energy loss) between the lower half of a 3-phase half-bridge and the battery ground).

Current limiting should be controlled by a microprocessor, which can be realized as a DAC (digital to analogue converter) to set the required current and then a PWM controller to limit it. That enables motor currents in all phases to be controlled accurately under all possible conditions.

Transition to Linear Flight

VTOL flight will be extremely costly in terms of energy for a compact vehicle that inevitably can only control a relatively small mass-flow of air. It is therefore important to consider the case of a compact vehicle that can take off and land vertically but that has the capability of transitioning to linear flight as in the preferred and second embodiments. Using multiple electric fans as described above together with an active control system based on accelerometer and other sensor data, one can design compact electric aircraft that can take-off and land extremely quickly. For example, the craft described in the second embodiment can easily take-off and transition to linear flight within 15 seconds even in complex surroundings. This is very different to the case of a helicopter where the single large rotor means that the fast and rapid attitude and position adjustments required to navigate a complex environment are simply not possible.

When in linear flight the efficiency of the vehicle can be increased enormously as a wing may be used to create a large slowly moving mass flow giving lift-to-drag ratios as large as 40:1. In order to achieve good lift to drag when in linear flight the lifting surfaces would preferably be folded or retracted. This allows a compact vehicle to take-off and to unfurl or un-retract its wing or wings whilst in the process of transition to linear flight.

Sealing of Vertical Fans

When in linear flight, beyond a certain speed the lifting fans potentially create substantial aerodynamic drag as they essentially represent "holes" in the body of the aircraft. Many of the lifting fans can therefore be sealed from the airflow by the use of sliding of folding panels which act to form (when closed) a smooth contiguous surface with the rest of the aircraft surface. This increases the efficiency of linear flight and allows a faster speed to be attained for the same power consumption. Some lifting fans may be left "open" if required in order to create changes to the angle of attack of the craft during linear operation or to assist the aerodynamic lift if required.

Use of Conventional Flying Surfaces for Flight Control

In a further embodiment all (or most) lifting and directional fans are sealed when in linear flight and conventional flying surfaces such as elevators, ailerons and a rudder allow control of the aircraft in this regime.

Use of Conventional Jets for Lateral Propulsion

High speed lateral propulsion may be achieved by the use of electric ducted fans for vertical take-off and landing procedures. Linear propulsion is then provided by conventional jet engines. Currently available jet engines can produce better dynamic thrust than electric ducted fans and so such a hybrid configuration will have a greater range in linear flight. In addition flight safety is primarily a function of the vertical system and so only one or a few powerful jet engines are needed for lateral propulsion. Finally for lateral propulsion in one direction only the relatively slow thrust response characteristic of a jet engine is not a problem.

Power Distribution

In the preferred and second embodiments separate battery systems have been used for each electric motor. This has the advantage of increasing safety and avoiding the problem of distributing high currents at low voltage around the aircraft. In a commercial aircraft, however, the batteries are preferably located in a central location and a power distribution system 900 is arranged to distribute power to each of the motors. FIG. 9 shows one embodiment of such a distribution system appropriate for the case of the preferred embodiment where copper bars are used to distribute 1200 amps at 50 V. The thickness of the bars must be chosen so that Ohmic heating does not heat the bars beyond a safe temperature. The presence of high frequencies in the individual currents to each motor (the motors are controlled by high frequency PWM signals) must be smoothed out by use of large capacitors so that the skin effect does not produce significant anomalous Ohmic heating and EM emissions do not cause problems with the proper functioning of on-board electronics. Careful design of the geometry of the conducting bars can somewhat reduce real heating and hence both the weight of the electrical distribution system and its power loss due to Ohmic heating may be acceptably minimised.

When better ESCs are used which allow faster control of the motors one can expect that the skin effect can become somewhat more important (although capacitors must still be used to remove frequencies over around 500 Hz). This will mean that either the weight of the electrical distribution system will have to go up or its efficiency will go down. In such circumstances a person skilled in the art of electrical engineering will fully appreciate how the well-known technology of high voltage efficient power transfer can be applied to distributing the power required by each motor from a central battery system under medium or high tension (i.e. usually 300 V or 600 V for small vehicles).

Battery Charging

A person skilled in the art will appreciate that a battery powered vehicle must comprise a charging system. Such charging systems are well known from the automotive sector and so will not be discussed here.

Improvement of Battery Technology

Due to the current problem of global warming enormous effort worldwide is now being put into developing better batteries. A doubling of the stored energy per weight would essentially produce a doubling in vehicle autonomy in VTOL. Currently there are many different technologies that could provide this. For example, the US company EESTOR is working on a super-capacitor that promises approximately double the energy per weight of the Lithium polymer batteries used in the preferred embodiment. The company Revolt Technology is claiming a three-fold increase. The University of St Andrews in Scotland is working on an air-breathing battery. This technology could possibly produce up to 7 MJ/kg within ten years.

Incorporation into Conventional Aircraft

The preferred embodiment essentially describes a propulsion system for VTOL and transition to and from linear flight. With constantly improving battery technology the weight of such a propulsion system continues to fall significantly so it is possible to incorporate such propulsion systems into conventional winged aircraft (such as general aviation aircraft and even commercial jets) such that they may execute VTOL flight. The extra weight penalty of the electric ducted fans and control electronics is expected in many cases to be small, the major weight being the batteries.

Hybrid Technology

The batteries in the preferred embodiment may be replaced in a further embodiment by a gas turbine or internal combustion engine connected to an electrical generator. Alternatively a lower mass of batteries can be charged in flight by a gas turbine or internal combustion driven generator. Calculations show that such hybrid solutions using currently available gas turbine based generators do improve significantly VTOL and linear flight autonomy—with such improvements potential commercial applications of the technology exist today without recourse to future battery technologies.

Safer Control Systems

One of the merits of the technology described in the present application is safety. By having many independent propulsion units each giving a small thrust, the failure of any one or of even a few such units is fundamentally unimportant. Such an event certainly does not have to lead to an accident. This is manifestly not the case with conventional VTOL aircraft where the failure of a thrust unit close to the ground usually leads directly to a catastrophic accident. However, in order to benefit to the maximum extent of the increased safety inherent in the technology described herein, it is important to arrange for independent battery, sensor and control systems.

For example, if there is only one central battery system and a fault develops in this battery system, the craft may crash despite the fact that it has many thrust units. Simply the power to all thrust units can be cut by such a fault. In addition, if there is only one sensor system and a fault arises in this system, then an accident may also occur. Finally the same problem occurs with all the control systems of the craft. It is therefore clear that in order to take advantage of the increased safety inherent in the invention, redundant and independent systems should be employed to avoid a single fault leading to an accident.

Flight in Gusty and Extreme Conditions

Conventional aircraft cannot operate safely in gusty and extreme conditions. This is because large and rapid changes in airflow lead to large and rapidly changing forces on the aircraft. Since conventional aircraft cannot respond to such forces rapidly and in a directionally accurately manor, unpredictable motion ensues—with unpredictable consequences. The present invention is able to solve this problem since many small electric ducted fans mounted in different directions can in principle produce a rapid thrust response in any direction and at any position required. With the correct choice of motion/position sensors, motors, motor sensors, fans, electronic speed controllers and control systems, a vehicle based on the technology of the present invention may therefore be designed to operate safely in gusty and extreme conditions.

Aircraft Cross-Wind Landing Stabilization System Conventional aircraft often have to make landings when a significant cross-wind component exists. Light aircraft are rated to a certain maximum cross-wind. Beyond this maximum cross-wind the aircraft is unable to make a safe landing.

There are two standard flying techniques which are used to perform safe cross-wind landings. The first is to fly the aircraft at an angle into the wind so that the approach follows the direction of the runway but the nose of the aircraft does not align with the runway. At the moment before touchdown rudder is then used to swing the nose straight and touch down.

The second technique is to use a crossed rudder and aileron input from earlier in the approach such that the aircraft is forced to side-slip down the approach to a straight-on landing with the aircraft tilted to one side.

Both of the above techniques are undesirable as in the first, late application of rudder can result in the undercarriage sustaining damage or the aircraft drifting off the runway and in the second anomalous drag and structural forces are implicit in addition side-slipping fundamentally decreases the safety of flight operation when gusty conditions are present.

In a further embodiment of the present invention a plurality of electric ducted fans are installed facing laterally (both right and left) at the nose and at the tail of a conventional aircraft (for instance 707,708). By installing sensors to measure the horizontal component of the ground velocity at each fan location 707,708 a computer is used to control the thrust of the fans in such a way as to annul any aircraft lateral drift (with respect to the runway) when the aircraft is on the approach with its nose aimed down the runway.

Sudden gusts of wind may easily be compensated for as small electric ducted fans paired with appropriate brushless motors and electronic speed controllers are capable of fast thrust response. With such a stabilization system a light aircraft can be kept on the approach and pointing in the correct direction irrespective of cross-wind and cross-wind gusts.

The energy required for such a stabilization system is relatively small and hence the weight of batteries does not pose a problem for conventional light aircraft. In addition, powerful electric ducted fans are extremely light and small and hence are easily installable in a conventional aircraft. The fans and associated ducts may be sealed from the airflow when not in use in order to reduce drag much as conventional landing gear is sealed above a certain airspeed.

The above stabilization system may also be applied to larger aircraft with greater numbers of fans and/or larger fans. Power from the conventional aircraft engine may be used to drive such an electric stabilization system instead of or in conjunction with batteries.

In a further embodiment, in order to enjoy the best rate of change of thrust in light wind conditions oppositely opposed fans may partially provide oppositely and counteracting forces such that all motor RPMs are above a certain minimum.

The same type of system may also be used to compensate for loss of lift due to wind-shear. Wind shear is dangerous because a sudden change in airflow direction can lead to a stalled wing in flight at the slow speeds characteristic of take-off and landing. In a further embodiment a plurality of vertically mounted electric ducted fans provide rapid compensation for such loss of lift when combined with speed sensors, electronic speed controllers, a control computer and a power source. Since compensation of vertical lift loss due to wind-shear need only occur for some seconds or tens of seconds at most in order for the aircraft to recover, again very limited battery weight is required. Preferably when not in use the fans and associated ducts would again be sealed from the airflow in order to reduce drag above a certain airspeed.

Summary

Known Electric Ducted Fans, which are based on brushless motor technology, are currently between 20 and 50 times lighter than conventional internal combustion engines per useful watt of energy. Such electric ducted fans are also small, cheap, of simple construction and reliable. By arranging many electric ducted fans in a vertical and in one or more lateral orientations, an aircraft may be constructed that has the capability to change rapidly (by direct modulation of motor power) its thrust in a variety of directions and at a variety of positions around the craft. Combined with a position/motion sensor system and a control system such an aircraft is able to execute extremely stable and safe VTOL and linear flight manoeuvres and to operate under extreme and gusty condition with indemnity. Such an aircraft can be designed to be essentially immune from component mechanical failure.

Although the present invention has been described with reference to preferred embodiments, it will be understood by those skilled in the art that various changes in form and detail may be made to the particular embodiments discussed above without departing from the scope of the present invention as set forth in the accompanying claims.

The invention claimed is:

1. A Vertical Take-Off and Landing ("VTOL") aircraft comprising a system of electrically powered ducted fans having a maximum power, wherein:
   a thrust of one or more of said fans of said system of fans is controlled by altering power supplied to a fan driving motor; and
   said system of fans comprises a first plurality of vertically mounted fans having a first diameter for controlling said aircraft in a vertical direction and a second plurality of vertically mounted fans having a second diameter for controlling said aircraft in said vertical direction, wherein the ratio of said second diameter to said first diameter is greater than or equal to 1.5,
   wherein said aircraft further comprises a controller configured to:
   initially set the first plurality of fans to 50% of maximum power during take-off, iteratively increase or decrease power to said second plurality of fans until the aircraft changes altitude,
   iteratively adjust power to the first plurality of fans to respond to height transients in altitude, and
   adjust power to said second plurality of fans using an independent iteration loop resulting in said system of fans maintaining an overall vertical thrust amount.

2. A Vertical Take-Off and Landing aircraft as claimed in claim 1, wherein one or more of said fans are powered by one or more batteries or other sources of electrical energy.

3. A Vertical Take-Off and Landing aircraft as claimed in claim 1, wherein one or more of said fans are powered by one or more electrical generators connected to one or more gas turbines or one or more internal combustion engines or one or more other sources of energy.

4. A Vertical Take-Off and Landing aircraft as claimed in claim 1, wherein said motor is controlled by Pulse Width Modulation ("PWM").

5. A Vertical Take-Off and Landing aircraft as claimed in claim 1, wherein at least some of said fans are arranged or operated so that:
   in a mode of operation the net angular momentum of said fans is substantially zero so that said aircraft is not caused to rotate substantially about a given axis; or
   in a mode of operation the net angular momentum of said fans is arranged to be non-zero so that said aircraft may be caused to rotate in a controlled or desired manner.

6. A Vertical Take-Off and Landing aircraft as claimed in claim 1, wherein said first plurality of vertically mounted fans comprises at least 5 fans.

7. A Vertical Take-Off and Landing aircraft as claimed in claim 1, wherein said second plurality of vertically mounted fans comprises at least 5 fans.

8. A Vertical Take-Off and Landing aircraft as claimed in claim 1, wherein said first or second plurality of vertically mounted fans comprises a first group of fans powered by one or more first batteries or first other sources of electrical energy and a second group of fans powered by one or more second batteries or second other sources of electrical energy wherein failure of said one or more first batteries or first other sources of electrical energy does not result in failure of said second group of fans.

9. A Vertical Take-Off and Landing aircraft as claimed in claim 1, wherein said plurality of fans comprises a third plurality of horizontally or laterally mounted fans for controlling said aircraft in a horizontal or lateral direction.

10. A Vertical Take-Off and Landing aircraft as claimed in claim 1, wherein one or more of said fans are rotatable or pivotable for thrust vectoring or for converting vertical thrust into thrust having a horizontal or lateral component or for converting horizontal or lateral thrust into thrust having a vertical component.

11. A Vertical Take-Off and Landing aircraft as claimed in claim 1, further comprising one or more distance determining devices or sensors for determining the vertical distance between one or more of said fans or other components of said aircraft and the ground or another location.

12. A Vertical Take-Off and Landing aircraft as claimed in claim 1, wherein said aircraft comprises a remotely controlled drone, a self-controlled drone, a remotely controlled passenger carrying aircraft or a pilot controlled aircraft.

13. A Vertical Take-Off and Landing aircraft as claimed in claim 1, wherein:
   (i) in a first mode of operation one or more vertically mounted fans and one or more horizontally or laterally mounted fans are used to control the flight of said aircraft; and
   (ii) in a second mode of operation one or more horizontally or laterally mounted fans and one or more ailerons or rudders or flaps or other aircraft control surfaces are used to control the flight of said aircraft.

14. A Vertical Take-Off and Landing aircraft as claimed in claim 1 further comprising:
   one or more propellers for propelling said aircraft in a horizontal direction or one or more turbo-fans or jet engines for propelling said aircraft in a horizontal direction.

15. A Vertical Take-Off and Landing aircraft as claimed in claim 1 further comprising:
   a plurality of sensors to determine flight parameters of said aircraft; and
   one or more Electronic Speed Controllers ("ESCs") arranged to receive sensor data from said plurality of sensors and to control a thrust of said aircraft by controlling the thrust of one or more of said fans.

16. A Vertical Take-Off and Landing aircraft as claimed in claim 2, wherein said one or more batteries or other sources of electrical energy are recharged in flight by one or more electrical generators connected to one or more gas turbines or one or more internal combustion engines or one or more solar panels or one or more other sources of energy.

17. A Vertical Take-Off and Landing aircraft as claimed in claim 9, wherein said third plurality of horizontally or laterally mounted fans comprises a first group of fans mounted in a first horizontal direction and a second group of fans mounted in a second horizontal direction, wherein said second horizontal direction is substantially orthogonal to said first horizontal direction.

18. A Vertical Take-Off and Landing aircraft as claimed in claim 11, wherein said distance determining devices or sensors are selected from the group consisting of (i) a laser ranging time of flight sensor; (ii) an inertial navigation system comprising one or more accelerometers; (iii) a Global Positioning System ("GPS") device; (iv) a camera or video camera system; and (v) an image recognition system.

19. A method of operating a Vertical Take-Off and Landing ("VTOL") aircraft comprising system of electrically powered ducted fans to propel said aircraft, said plurality of fans comprises a first plurality of vertically mounted fans having a first diameter for controlling said aircraft in a vertical direction and a second plurality of vertically mounted fans having a second diameter for controlling said aircraft in said vertical direction, wherein the ratio of said second diameter to said first diameter is greater than or equal to 1.5, said method comprising:
   initially setting the first plurality of fans to 50% of maximum power during take-off;
   increasing or decreasing power to said second plurality of fans until the aircraft changes altitude;
   iteratively adjusting power to the first plurality of fans to respond to height transients in altitude, and
   adjusting power to said second plurality of fans using an independent iteration loop resulting in said system of fans maintaining an overall vertical thrust amount.

20. A method of controlling a Vertical Take-Off and Landing aircraft during take-off or landing or transition from vertical to horizontal flight or transition from horizontal to vertical flight, said method comprising the method of claim 19 and further comprising at least one of:
   (i) increasing, decreasing or varying power to at least some or all or said fans until one or more sensors determine that the distance between one or more of said fans or another component of said aircraft and the ground or another location is increasing, decreasing or remaining substantially constant;
   (ii) switching between using first sensors and second sensors to determine the distance between one or more of said fans or another component of said aircraft and the ground or another location as said distance is determined to increase, decrease or remain substantially constant;
   (iii) raising or lowering a landing gear;
   (iv) determining a flight plan or receiving a flight plan and adjusting power to at least some or all or said fans so that said aircraft is guided along side flight plan;
   (v) adjusting or formulating a new flight plan in response to sensor data received instructions;
   (vi) deploying or retracting a foldable or retractable aerofoil;
   (vii) selecting or adjusting a flight angle or angle of attack;
   (viii) sealing or covering one or more fans when said aircraft makes a transition from vertical to horizontal flight;
   (ix) unsealing or uncovering one or more fans when said aircraft makes a transition from horizontal to vertical flight
   (x) propelling said aircraft in said vertical direction using said one or more fans; and
   (xi) propelling said aircraft in a horizontal or lateral direction using one or more gas turbine engines.

* * * * *